US012563141B2

(12) United States Patent
Arshad

(10) Patent No.: US 12,563,141 B2
(45) Date of Patent: *Feb. 24, 2026

(54) SYSTEM AND METHOD OF CONNECTING A CALLER TO A RECIPIENT BASED ON THE RECIPIENT'S STATUS AND RELATIONSHIP TO THE CALLER

(71) Applicant: Farhad Arshad, Los Angeles, CA (US)

(72) Inventor: Farhad Arshad, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,819

(22) Filed: Sep. 1, 2023

(65) Prior Publication Data

US 2023/0412730 A1     Dec. 21, 2023

Related U.S. Application Data

(63) Continuation of application No. 17/375,663, filed on Jul. 14, 2021, now Pat. No. 11,785,139, which is a
(Continued)

(51) Int. Cl.
*H04M 3/42*     (2006.01)
*H04M 3/436*    (2006.01)
*H04M 3/533*    (2006.01)

(52) U.S. Cl.
CPC ..... *H04M 3/4211* (2013.01); *H04M 3/42093* (2013.01); *H04M 3/42374* (2013.01);
(Continued)

(58) Field of Classification Search
None
See application file for complete search history.

(56) References Cited

U.S. PATENT DOCUMENTS

2006/0182248 A1* 8/2006 Smith ................. H04M 1/2745
                                            379/201.01
2006/0288099 A1* 12/2006 Jefferson ................. H04L 51/04
                                            709/224
(Continued)

FOREIGN PATENT DOCUMENTS

WO      2008039253 A1     4/2008

OTHER PUBLICATIONS

European Patent Application No. 20156772.4, Search Report dated Jun. 17, 2020.

(Continued)

*Primary Examiner* — Quynh H Nguyen
(74) *Attorney, Agent, or Firm* — Ahmann Kloke LLP

(57) ABSTRACT

An example method comprising receiving a plurality of categories of availability statuses, receiving a plurality of categories of different contact groups, identifying, for each contact, at least one contact group, receiving a plurality of rules for call handling, each of the plurality of rules being associated with at least one of the different availability statuses and at least one of the different contact groups, receiving a telephone call from a first caller, identifying a caller identifier of the first caller, determining a contact group of the first caller, determining a current availability status of the recipient, identifying an applicable rule based on the contact group of the first caller and the current availability status of the recipient, selecting an audio prompt based on the applicable rule, and presenting the audio prompt to the first caller based on the applicable rule, the audio prompt indicating a preference of communication.

19 Claims, 16 Drawing Sheets

Related U.S. Application Data continuation of application No. 16/596,676, filed on Oct. 8, 2019, now Pat. No. 11,095,771.

(60) Provisional application No. 62/804,124, filed on Feb. 11, 2019.

(52) U.S. Cl.
CPC ..... *H04M 3/42382* (2013.01); *H04M 3/4365* (2013.01); *H04M 3/53333* (2013.01)

(56) References Cited

U.S. PATENT DOCUMENTS

| | | | |
|---|---|---|---|
| 2010/0098231 A1 | 4/2010 | Wohlert | |
| 2013/0260725 A1 | 10/2013 | Sharma | |
| 2015/0281441 A1 | 10/2015 | Kelly | |
| 2016/0094708 A1* | 3/2016 | Brown | H04M 15/8351 |
| | | | 455/566 |
| 2018/0352080 A1* | 12/2018 | Chong | H04W 8/18 |

OTHER PUBLICATIONS

European Patent Application No. 20156772.4, Search Report dated Sep. 24, 2021.

\* cited by examiner

Figure 2:
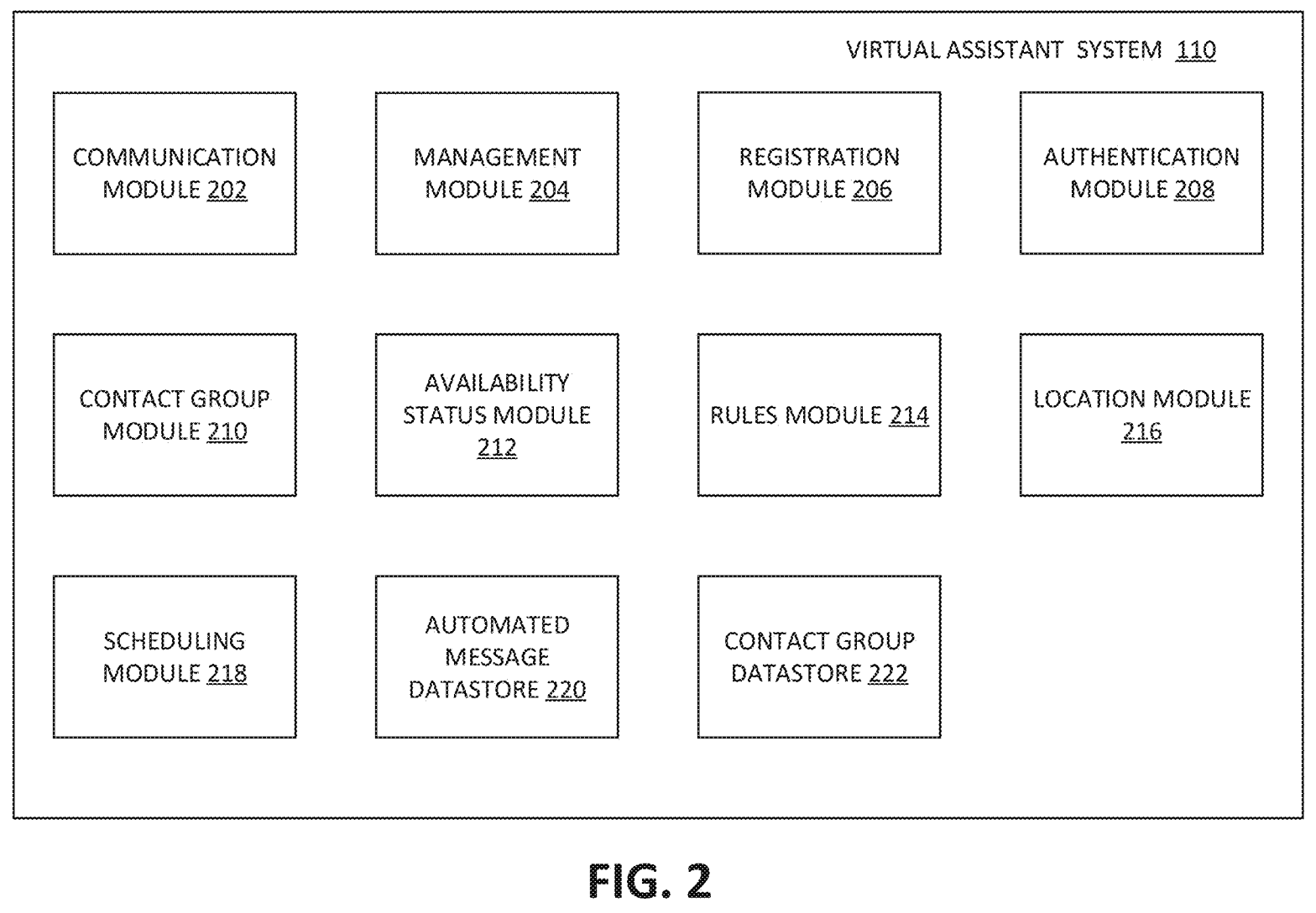

VIRTUAL ASSISTANT SYSTEM 110

| | | | |
|---|---|---|---|
| COMMUNICATION MODULE 202 | MANAGEMENT MODULE 204 | REGISTRATION MODULE 206 | AUTHENTICATION MODULE 208 |
| CONTACT GROUP MODULE 210 | AVAILABILITY STATUS MODULE 212 | RULES MODULE 214 | LOCATION MODULE 216 |
| SCHEDULING MODULE 218 | AUTOMATED MESSAGE DATASTORE 220 | CONTACT GROUP DATASTORE 222 | |

RECEIVE REQUEST TO REGISTERED USER
302

AUTHENTICATE THE REGISTERED USER
304

ORGANIZE CONTACTS INTO DIFFERENT
CONTACT GROUPS 306

SET CATEGORIES OF AVAILABILITY
STATUSES AND RULES 308

IDENTIFY DIFFERENT TYPES OF RECIPIENT
STATUS 310

DETERMINE RESPONSE TO DIFFERENT
CONTACT GROUPS 312

800

STATUS OF RECIPIENT 802

IDENTIFY BUSINESS GROUP 804

FREE TIME 806

RING THROUGH 808

PERSONAL TIME 810

VOICEMAIL7 812

CONVERT VOICEMAIL TO TEXT 814

HOLD TEXT 816

TEXT EXCHANGE WITH CALLER 818

WORK TIME 820

RING THROUGH 808

DO NOT DISTRUB TIME 822

VOICEMAIL8 824

CONVERT VOICEMAIL TO TEXT 826

HOLD TEXT 828

TEXT EXCHANGE WITH CALLER 830

| Time | Monday | Tuesday |
|---|---|---|
| 8 a.m. | Free Time | Personal Time |
| 9 a.m. | Work Time | Work Time |
| 10 a.m. | | |
| 11 a.m. | Do Not Disturb | |
| 12 p.m. | Work Time | |
| 1 p.m. | | Do Not Disturb |
| 2 p.m. | | Work Time |
| 3 p.m. | | |
| 4 p.m. | | |
| 5 p.m. | Free Time | |
| 6 p.m. | | |

| Group | # txt msgs |
|---|---|
| Immediate family | 25 |
| Emergency | 5 |
| Friends | 60 |
| Business | 13 |
| Blocked/Unlisted | 0 |

1210

1230

| Group | # calls | Duration of calls |
|---|---|---|
| Immediate family | 15 | 45 min |
| Emergency | 10 | 15 min |
| Friends | 20 | 58 min |
| Business | 60 | 3 hrs 3 min |
| Blocked/Unlisted | 25 | 3 min |

1240

Graph

1300

SEND AUDIO PROMPT
1302

RECEIVE AUDIO MESSAGE FROM A CALLER
1304

CONVERT THE AUDIO MESSAGE TO A FIRST
TEXT 1306

SEND THE FIRST TEXT TO RECIPIENT 1308

RECEIVE A SECOND TEXT FROM RECIPIENT
1310

SEND A THIRD TEXT TO THE CALLER 1312

CONTINUE EXCHANGE OF TEXT BETWEEN
CALLER AND RECIPIENT 1314

1400

| Priority | Free Time | Personal Time | Work Time | DND |
|---|---|---|---|---|
| 1 | Emergency | Immediate Family | Emergency | Emergency |
| 2 | Immediate Family | Emergency | Business | Immediate Family |
| 3 | Friends | Friends | Immediate Family | Business |
| 4 | Business | Business | Friends | Friends |
| 5 | Unlisted/ Blocked | Unlisted/ Blocked | Unlisted/ Blocked | Unlisted/ Blocked |

1500

| Priority | Free | Personal | Work | DND |
|---|---|---|---|---|
| Immediate Family | SEND MESSAGE | SEND MESSAGE | HOLD | HOLD |
| Emergency | SEND MESSAGE | SEND MESSAGE | SEND MESSAGE | HOLD |
| Friends | SEND MESSAGE | SEND MESSAGE | HOLD | HOLD |
| Business | SEND MESSAGE | HOLD | SEND MESSAGE | HOLD |
| Unlisted/ Blocked | HOLD | HOLD | HOLD | HOLD |

SYSTEM AND METHOD OF CONNECTING A CALLER TO A RECIPIENT BASED ON THE RECIPIENT'S STATUS AND RELATIONSHIP TO THE CALLER

CROSS-REFERENCE TO RELATED APPLICATIONS

The present application is a continuation of U.S. patent application Ser. No. 17/375,663 filed Jul. 14, 2021, entitled "System and Method of Connecting a Caller to a Recipient Based on the Recipient's Status and Relationship to the Caller," which is a continuation of U.S. patent application Ser. No. 16/596,676 filed Oct. 8, 2019, entitled "System and Method of Connecting a Caller to a Recipient Based on the Recipient's Status and Relationship to the Caller," now U.S. Pat. No. 11,095,771, which claims the benefit of U.S. Provisional Patent Application No. 62/804,124 filed Feb. 11, 2019, entitled "System and Method of Connecting a Caller to a Recipient Based on the Recipient's Status and Relationship to the Caller" which is incorporated by reference herein.

FIELD OF THE INVENTION(S)

Embodiments of the present invention(s) relate generally to a platform which allows a recipient of a telephone call to dynamically select a way the recipient communicates with others.

BACKGROUND

The advancement of mobile technology has made it possible for people to communicate or connect with other people almost anywhere and almost anytime. While communication is necessarily a multi-directional process, the caller (i.e., the individual trying to communicate with a recipient) chooses the best time and method of communication. Such times and/or methods of communication are not necessarily convenient to the recipient. As the number of people attempting to communicate increases, each recipient receives an increasingly large number of interruptions from different callers.

Even momentary distractions from work, appointments, time with family, and the like combine to reduce concentration, add confusion for planning, reduce effectiveness, and add to annoyances. Instead of being able to focus on one or more tasks, people are often interrupted. Even if the calls go to voicemail, "micro interruptions" of calls and notifications are distracting and can completely disrupt concentration. This waste of time and mental energy has a direct impact on productivity and life enjoyment.

Further, an increasing number of scam or spam callers using the computerized automatic dialer to deliver live or pre-recorded messages further increases the amount of wasted time and wasted productivity.

One solution to the problem is to direct all phone calls to voicemail and turn off all notifications. The problem with this "one size fits all solution" is that the recipient is ultimately forced to review all of the voicemails and triage recorded calls, which may result in emergency or urgent calls being missed or delayed.

Further, although some calls may not be urgent, particular calls may be of personal importance to the recipient. Lumping calls together buries the call that the recipient may want to immediately return. By treating all calls the same, the recipient of the calls, again, must spend valuable time and concentration to sort through a batch of missed communications. This perpetuates a cycle of missed calls, voicemails, and rushed phone calls.

SUMMARY

An example nontransitory computer readable medium comprises instructions executable by a processor. The instructions may be executable to perform a method. The method may comprise receiving, from a recipient, a plurality of categories of availability statuses of the recipient, each of the categories of the plurality of categories being associated with a different availability status, receiving a plurality of categories of different contact groups of the recipient, identifying, for each contact of a plurality of contacts, at least one contact group of the different contact groups, there being at least two contacts of the plurality of contacts belonging to at least two different contact groups, receiving a plurality of rules for call handling, each of the plurality of rules being associated with at least one of the different availability statuses of the recipient and at least one of the different contact groups, there being at least two rules of the plurality of rules, each rule of at least two rules being associated with different availability statuses of the plurality of availability statuses, receiving a telephone call from a first caller, identifying a caller identifier of the first caller, determining a contact group of the first caller of the different contact groups, determining a current availability status of the recipient at the time of the call from the first caller, the current availability status being from the availability statuses of the recipient, identifying an applicable rule of the plurality of rules based on the contact group of the first caller and the current availability status of the recipient, selecting an audio prompt of a plurality of audio prompts based on the applicable rule, each of the plurality of audio prompts including different information, and presenting the audio prompt to the first caller based on the applicable rule, the audio prompt indicating a preference of how the recipient prefers for the first caller to communicate with the recipient.

In various embodiments, the different contact groups include a contact group of work contacts and a group of family contacts. The plurality of categories of availability statuses of the recipient may include "busy," "free," and "unavailable." In some embodiments, the method further comprising receiving a selection of the current availability status from the recipient.

It will be appreciated that the method may further comprise determining the current availability status of the recipient based on one or more entries of the recipient's calendar indicating an activity of the recipient at a particular time. In some embodiments, the audio prompt to the first caller indicates that the first caller should send a text to the recipient and the first caller is not given the opportunity leave a voicemail during the first caller's call. In some embodiments, the method further comprises receiving a telephone call from a second caller, identifying a caller identifier of the second caller, determining a contact group of the second caller of the different contact groups, the contact group of the second caller being different from the contact group of the first caller, identifying an applicable rule of the plurality of rules based on the contact group of the second caller and the current availability status of the recipient, and passing the call from the second caller directly to the recipient based on the applicable rule of the plurality of rules based on the contact group of the second caller and the current availability status of the recipient. In some embodiments, the method further comprises receiving a telephone call from a third caller, identifying a caller identifier of the third caller, determining a contact group of the third caller of the different contact groups, the contact group of the third caller being different from the contact group of the first caller and the contact group of the second caller, identifying an applicable rule of the plurality of rules based on the contact group of the third caller and the current availability status of the recipient, and providing, based on the applicable rule of the plurality of rules based on the contact group of the third caller and the current availability status of the recipient, an interactive audio system requesting the third caller to indicate if their call is urgent, and if the call is urgent then passing the call to the recipient, otherwise passing their call to a voicemail system.

In various embodiments, the method further comprises receiving, after the audio prompt, from the first caller a time when the caller is available for a return call from the recipient, determining if the recipient's calendar indicates that the time when the first caller is available for the return call from the recipient is available for the recipient, and if the recipient's calendar indicates that the time when the first caller is available, then providing an indication in the recipient's calendar regarding the return call and providing an indication that the time is calendared to the first caller.

An example method comprise receiving, from a recipient, a plurality of categories of availability statuses of the recipient, each of the categories of the plurality of categories being associated with a different availability status, receiving a plurality of categories of different contact groups of the recipient, identifying, for each contact of a plurality of contacts, at least one contact group of the different contact groups, there being at least two contacts of the plurality of contacts belonging to at least two different contact groups, receiving a plurality of rules for call handling, each of the plurality of rules being associated with at least one of the different availability statuses of the recipient and at least one of the different contact groups, there being at least two rules of the plurality of rules, each rule of at least two rules being associated with different availability statuses of the plurality of availability statuses, receiving a telephone call from a first caller, identifying a caller identifier of the first caller, determining a contact group of the first caller of the different contact groups, determining a current availability status of the recipient at the time of the call from the first caller, the current availability status being from the availability statuses of the recipient, identifying an applicable rule of the plurality of rules based on the contact group of the first caller and the current availability status of the recipient, selecting an audio prompt of a plurality of audio prompts based on the applicable rule, each of the plurality of audio prompts including different information, and presenting the audio prompt to the first caller based on the applicable rule, the audio prompt indicating a preference of how the recipient prefers for the first caller to communicate with the recipient.

An example system comprises at least one processor and memory. The memory may include instructions to control the at least one processor to receive, from a recipient, a plurality of categories of availability statuses of the recipient, each of the categories of the plurality of categories being associated with a different availability status, receiving a plurality of categories of different contact groups of the recipient, identifying, for each contact of a plurality of contacts, at least one contact group of the different contact groups, there being at least two contacts of the plurality of contacts belonging to at least two different contact groups, receiving a plurality of rules for call handling, each of the plurality of rules being associated with at least one of the different availability statuses of the recipient and at least one of the different contact groups, there being at least two rules of the plurality of rules, each rule of at least two rules being associated with different availability statuses of the plurality of availability statuses, receiving a telephone call from a first caller, identifying a caller identifier of the first caller, determining a contact group of the first caller of the different contact groups, determining a current availability status of the recipient at the time of the call from the first caller, the current availability status being from the availability statuses of the recipient, identifying an applicable rule of the plurality of rules based on the contact group of the first caller and the current availability status of the recipient, selecting an audio prompt of a plurality of audio prompts based on the applicable rule, each of the plurality of audio prompts including different information, and presenting the audio prompt to the first caller based on the applicable rule, the audio prompt indicating a preference of how the recipient prefers for the first caller to communicate with the recipient.

BRIEF DESCRIPTION OF THE DRAWINGS

FIG. 2 depicts a block diagram of an example virtual assistant system according to some embodiments.

FIG. 11 depicts an example availability status calendar according to some embodiments.

5

Figure 13:
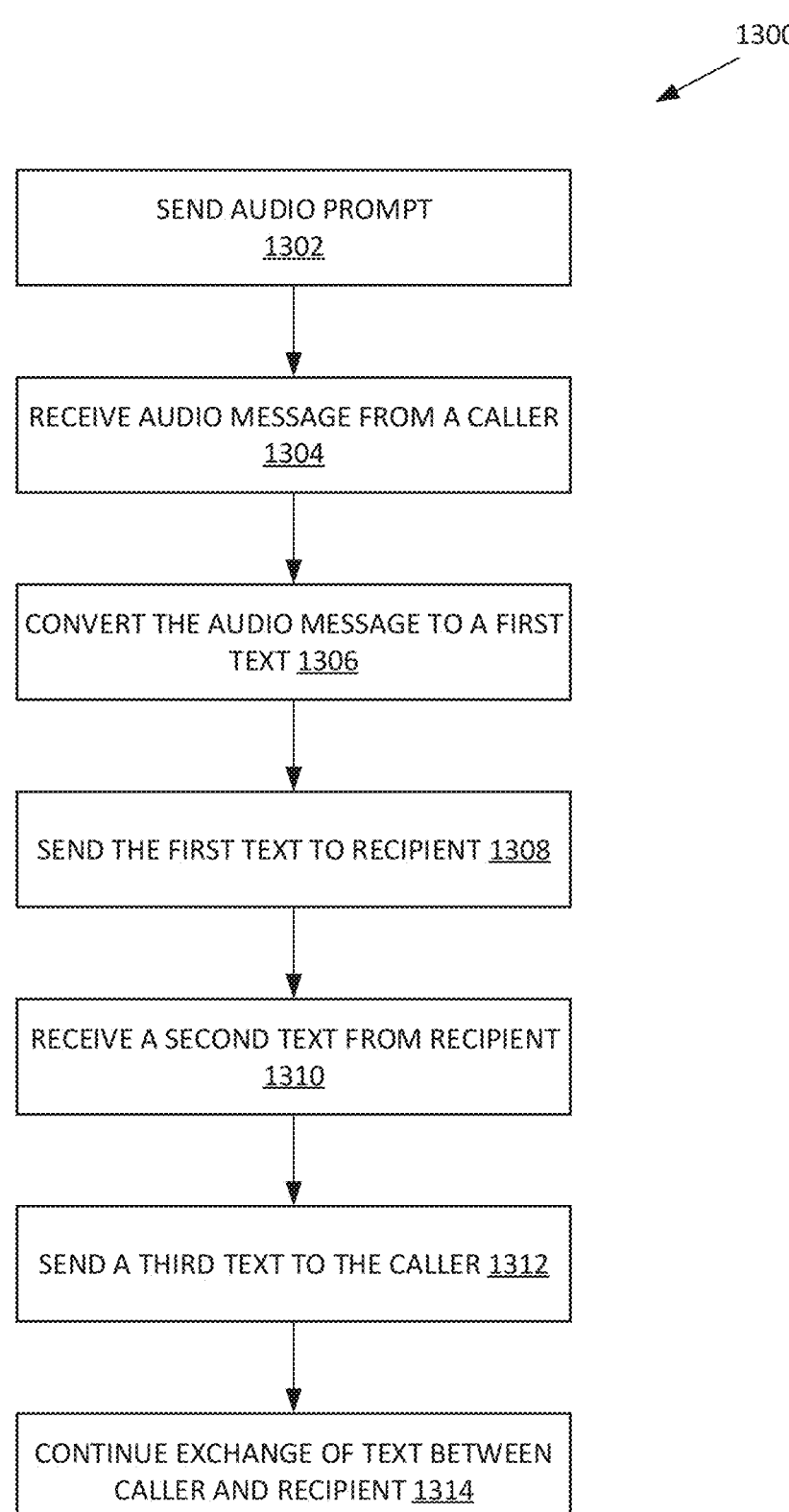

FIG. 13 depicts a method of text message exchange between a caller and a recipient according to some embodiments.

Figure 14:
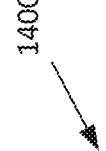

FIG. 14 depicts a table of the priority of various contact groups depending on the availability status according to some embodiments.

Figure 15:
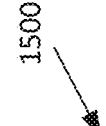

FIG. 15 depicts a table of the status of the text message based on the current availability status and the contact group the caller belongs to according to some embodiments.

Figure 16:
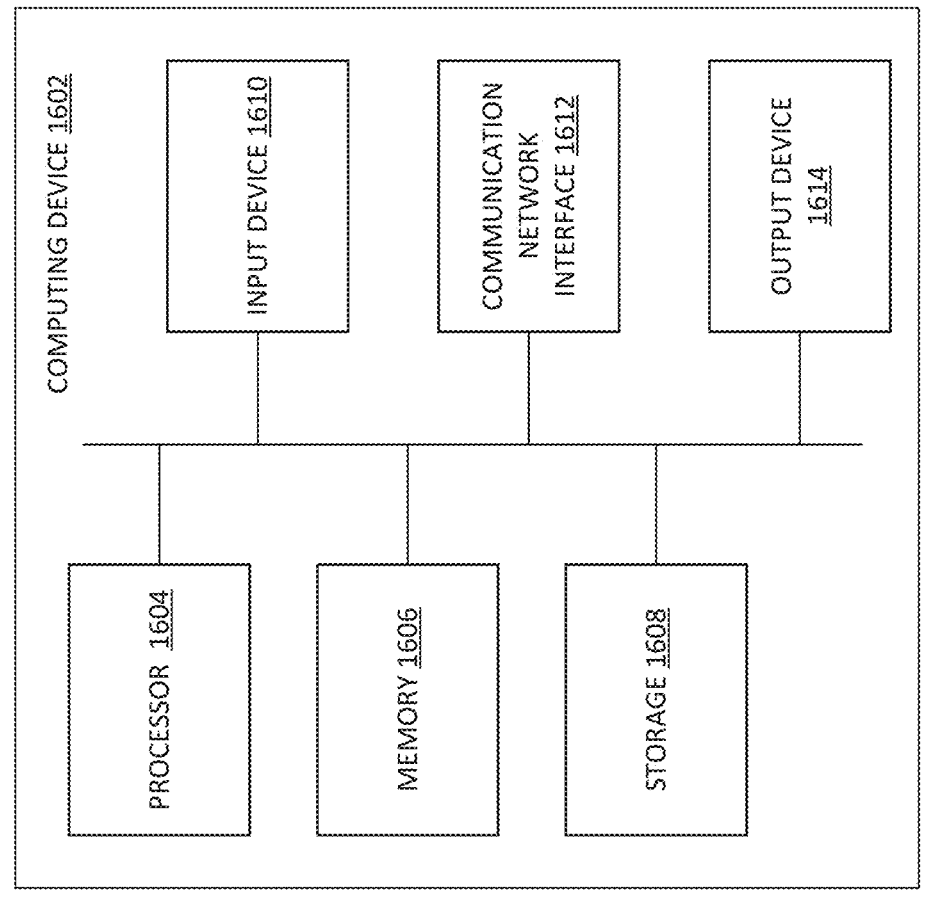

FIG. 16 depicts a block diagram of an example computing device according to some embodiments.

DETAILED DESCRIPTION

A virtual assistant system may enable a user (i.e., a call recipient) to engage in communicating with others in a time and manner that the user prefers. The virtual assistant may, for example, enable a user to automate different actions for managing communications based on: the type of communication, the availability status of the user when the communication is received, and the identity of the person attempting to reach the user. Further, the virtual assistant may automate communication with the caller to inform them how the user prefers to communicate and when. The virtual assistant may allow the user to indicate a preference for different types of communication-based on the identity of the person and/or the availability status of the user.

The virtual assistant system may manage communication from others (trying to reach the user) based on: (1) the availability status of the recipient (i.e., the user being called); and (2) the recipient's relationship with the person trying to reach the recipient. The virtual assistant system may allow the recipient of the call (e.g., the user of the virtual assistant system) to manually or dynamically set their availability status, group callers into groups, and create rules to respond to phone calls and other communications based on their availability, the relationship of the recipient with the person attempting to reach the recipient, and rules created by the recipient.

The availability status of the recipient includes a variety of different categories indicating a real-time state of the recipient. In one example, the recipient may manually set their availability status to any of several categories including, but not limited to "busy," "sleep," "do not disturb," and "free." A "busy" status may represent a time in which the recipient is not receptive to non-emergency communications (e.g., calls, text messages, or email) from people who do not have a close relationship with the caller. A "sleep" status may represent an extended time of inactivity such as during the hours the recipient is sleeping and watching a movie. A "do not disturb" status may represent a period of time in which the recipient is in a meeting and is not receptive to non-emergency messages. There may be any number of availability status categories. Other categories may include, for example, "in a meeting," "work," "family time," "on vacation," "unavailable," or the like. The recipient may create their own availability status categories.

Like the availability status categories, the user may group people and/or devices into any number of contact groups and may label or categorize each group. In one example, the recipient may label contact groups as "close family," "emergency," "critical business relationships," "friends," "business associates," "marketing," and the like. A potential messenger (e.g., individual who may attempt to communicate with the user or recipient) may be placed in only one contact group or, in some embodiments, multiple contact groups. The virtual assistant system may assign an individual and/or device that is not otherwise within a pre-defined contact group as "default" or "unknown."

The virtual assistant system may receive from the user of the mobile device rules for managing communications from individuals of different groups based on each of the different availability statuses. For example, a user may configure one or more rules to indicate: when calls from a caller or contact group may reach the recipient when calls from a caller or contact group are directed to voicemail, which audio prompts may be provided to a caller, call screening options, and/or the like.

When a person calls a recipient, for example, the virtual assistant system may determine the caller's contact group and the availability status of the user (i.e., the recipient). The virtual assistant system may then engage in a variety of different actions based on the rules established by the recipient. Based on the recipient's contact group and the availability status of the recipient, the virtual assistant system may pass the call to the recipient, direct the call to voicemail, present different voice prompts to the caller to request information (e.g., to request information for voicemail or provide the caller with an interactive menu with options as established by the user of the system), provide information as to the recipient's preferred time and/or communication type (e.g., the caller may prefer texts from non-work friends rather than voicemail), and/or present different choices to the caller.

As such, the recipient may control when they may be interrupted. The recipient may also control and automate communication with people attempting to reach the recipient (e.g., callers, people who send text messages, people who send email, and/or any other form of communication) regarding how the recipient prefers to be contacted. As a result, the recipient may communicate with others in a time, place, and manner of the recipient's preference.

The virtual assistant system may be software installed on the recipient's mobile system. In some embodiments, the mobile system is a smartphone and/or a system that is in communication with the recipient's smartphone. In some embodiments, the virtual assistant system is a web-based application which may be accessed by navigating to a particular web page on the internet.

Figure 1:
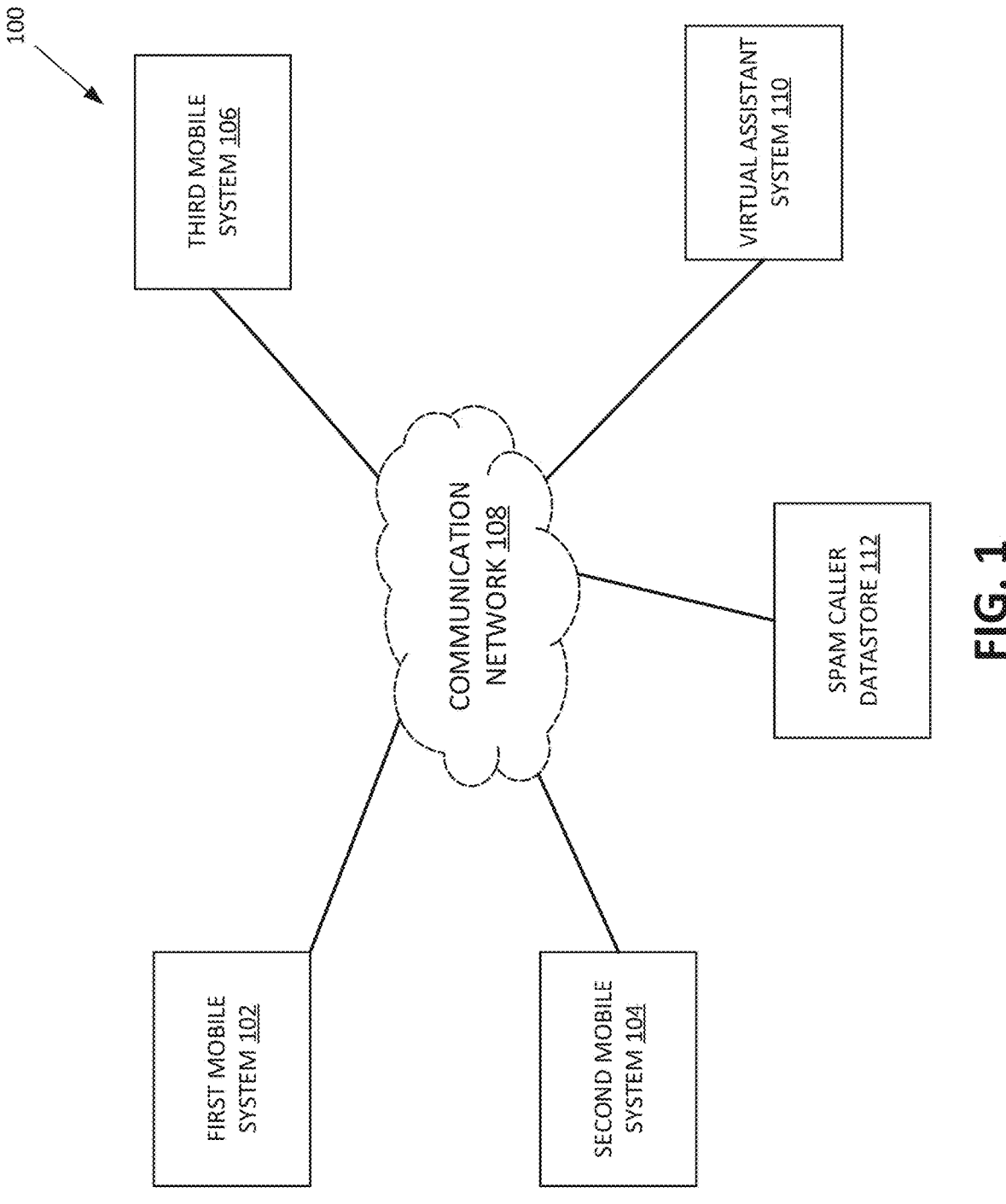
FIG. 1 depicts a block diagram of an example environment capable of dynamically selecting ways a recipient of a telephone call can communicate with others.

FIG. 1 depicts a block diagram of an example environment 100 including a virtual assistant system 110 capable of dynamically selecting a way a recipient of a telephone call can communicate with callers The example environment 100 includes a first mobile system 102, a second mobile system 104, a third mobile system 106, a communication network 108, a virtual assistant system 110, and a spam caller datastore 112. The first mobile system 102, the second mobile system 104, the third mobile system 104, and the virtual assistant system 110 may each be or include any number of digital devices. A digital device is any device with a processor and memory. Digital devices are further discussed herein (e.g., see FIG. 16).

The first mobile system 102, second mobile system 104, and third mobile system 106 may facilitate communication between users of the mobile systems and other associated systems. In some embodiments, the first mobile system 102, second mobile system 104, and third mobile system 106 may be or include one or more mobile devices (e.g., smartphones, cell phones, smart watches, tablet computer, or the like), desktop computers, laptop computers, and/or the like.

The communication network 108 represents one or more computer networks (e.g., LANs, WANs, cellar networks, POTs networks, and/or the like). The communication network 108 may provide communication between any of the first, second, and third mobile systems 102, 104, and 106, the virtual assistant system 110, and the spam caller datastore 112. In some implementations, the communication network 108 comprises computer devices, routers, cables, uses, and/or other network topologies. The communication network 108 may be wired and/or wireless. In various embodiments, the communication network 108 may comprise the Internet, one or more networks that may be public, private, IP-based, non-IP based, and so forth.

The virtual assistant system 110, further described herein, may be a part of any number of the mobile system(s). When the recipient (e.g., the user of the first mobile system 102 and the virtual assistant system 110) receives a call from a caller (e.g., a call coming from the second mobile system 104), the virtual assistant system 110 may determine the current availability status of the recipient and the contact group that the caller belongs. The virtual assistant system 110 may determine the current availability status of the recipient by retrieving a current availability status (e.g., manually set by the recipient, set based on time and/or date, set based on the recipient's calendar, and/or set based on the user's assistant). The virtual assistant system 110 may determine the contact group of the caller by comparing a caller identification, caller ID, and/or other identifiers (e.g., caller identifications and/or caller IDs) to a group list and/or members of different contact groups associated with the recipient.

With this information, the virtual assistant system 110 may determine how to respond to the incoming call based on a variety of predefined rules from the recipient. For example, the virtual assistant system 110 may determine that the availability status of the recipient is set to a "free" status. The virtual assistant system 110 may receive from the second mobile system 104 the caller ID and determine if the second mobile system 102 belongs to a particular contact group. Based on a predefined rule which instructs the virtual assistant system 110 to provide calls from the particular contact group to the recipient when the recipient's availability status is "free." Alternately, the virtual assistant system 110 may direct the call to the recipient (e.g., causing the recipient's smart phone to provide an audio and/or haptic notification of a call, text, or other communication), provide an audio prompt to the caller that requests additional information, provide an audio prompt to inform the caller when the recipient may be free, provide an audio prompt to inform the caller that the recipient prefers to communicate using a different medium (e.g., text or email), or block the call.

In another example, the virtual assistant system 110 may determine that the caller and/or the second mobile system 104 belongs to an "immediate family" contact group. In response to the virtual assistant system 110 determining that the availability status is set to "working" status and that the caller is from the "immediate family" contact group, the virtual assistant system 110 may apply a rule that allows the call from the first mobile system 102 to ring through to the first mobile system 102 while calls from individuals of other contact groups may be treated differently.

Depending on the availability status and the contact group that the caller belongs, the virtual assistant system 110 may provide different audio prompts (e.g., messages provided to the caller in a voicemail system). For example, if the availability status of the recipient is "in a meeting," the virtual assistant system 110 may provide an audio prompt to the caller from the "immediate family" contact group which indicates that the recipient may get back as soon as possible. In some embodiments, if the caller is from a different contact group such as the "business colleague" contact group, an audio prompt may indicate when the recipient anticipates being free (and/or how long the recipient expects to be busy). In another example, a caller associated with a business group may receive an audio prompt requesting the caller to leave behind a preferred time and/or date that the caller gets back to the caller.

In some embodiments, the virtual assistant system 110 may store the caller's response in voicemail, convert all or a portion of the response to text and provide the text to the user recipient in the form of a text message or email, insert a time entry into the recipient's calendar to block off the time for the recipient to communicate with the caller, or the like. In various embodiments, the virtual assistant system 110 may sort stored voicemails based on when the caller's preferred time and/or date of response to assist the recipient in reviewing the most urgent voicemails first.

Although many of these examples indicate calls, it may be appreciated that the virtual assistant system 110 may manage any type of communication including text, email, one-way audio communication, and/or any notifications.

In some embodiments, if the virtual assistant system 110 determines that, based on one or more predefined rules, the caller's contact group, and the recipient's availability status, that the recipient is not to receive the caller's call. In some embodiments, the virtual assistant system 110 may provide a voice prompt to the caller indicating when the recipient is free. In various embodiments, the virtual assistant system 110 may check the recipient's calendar to check when the user may be next free or is otherwise not blocked by a commitment (e.g., during working hours or within a predefined range of time established by the recipient).

The virtual assistant system 110 may be configured to check the calendar and, if the recipient is free, provide an indication when the recipient is free in a voice prompt to the caller which may encourage to call during these times. For example, the virtual assistant system 110 may determine through checking the recipient's calendar that, at the time of the call, a later time is identified as "free" or is otherwise not blocked by a commitment. The virtual assistant system 110 may be configured to check the calendar and, if the recipient is free, provide an indication when the recipient is free in a voice prompt to the caller which may encourage to call during these times.

The virtual assistant system 110 may hold any number of text messages, voicemail, notifications of the text message, or notifications of voicemail until the virtual assistant system 110 determines that the recipient's availability status is "free" or is a status where the user has indicated it is acceptable to receive voicemail messages and/or text messages. It may be appreciated that the virtual assistant system 110 may be configured by the user to indicate times or particular availability statuses where text messages may be provided to the user but not voicemails. Similarly, the virtual assistant system 110 may be configured to provide voicemails and/or text messages at other times or at particular availability statuses.

In some embodiments, the virtual assistant system 110 may wait a predetermined amount of time (e.g., a predetermined connection period) after the caller from a particular group calls the recipient to pass the call through. The predetermined connect period may change depending on the status of the recipient. For example, when the availability status is set to "personal," the virtual assistant system 110 may connect the call 2 seconds after the virtual assistant system 110 generates an audio message or text message identifying the caller. In one embodiment, the predetermined connect period may be used to determine the period of time to wait for the recipient to interact with their respective mobile system before disconnecting the call or sending an audio prompt (such as a voicemail prompt) to the caller.

The spam caller datastore 112 may be any structure and/or structures suitable for storing digital content (e.g., an active database, a relational database, a self-referential database, a table, a matrix, an array, a flat file, a documented-oriented storage system, a non-relational No-SQL system, an FTS-management system such as Lucene/Solar, and/or the like). The spam caller datastore 112 may store caller IDs of callers who either are or are suspected to be spam caller (e.g., advertisements, unrequested robotic calls, known scams, those on a "do not call" list, and the like).

The spam caller datastore 112 may include or be a centralized system where calls identified as being a spam or scam call (e.g., by being labeled by users of the virtual assistant system 110, from a do-not-call list, AT&T list of suspected calls, a Robocall list, and/or the like). Different users of the virtual assistant system 110 may rely on the spam caller datastore 112. For example, the virtual assistant system 110 may receive a call and check against the spam caller datastore 112 to determine if the call is likely a spam call or a scam call.

With the advancing telephone number spoofing technologies, scammers or spammers may spoof phone numbers and/or other identifiers to hide a caller ID of the scammer or spammer. In some embodiments, the spam caller datastore 112 may store the caller IDs of scam callers.

In various embodiments, the virtual assistant system 110 determine if a calling number may be a spam or scam call by keeping count of a number of times a particular caller ID shows up as an entry in the spam caller datastore 112. The virtual assistant system 110 may determine that at the particular caller ID is not a suspected scam caller if the number of times the particular caller ID shows up as an entry in the spam caller datastore 112 is less than a predetermined number of times.

In various embodiments, all or part of the virtual assistant system 110 may be a part of the first mobile system 102. In one example, the first mobile system 102 includes the virtual assistant system 110. The virtual assistant system 110 may be a part of the operating system of the first mobile system 102 or with the operating system of the first mobile system 102. For example, the virtual assistant system 110 may replace or work with a call management and/or voicemail function of an operating system (e.g., with Android OS). In one example, as telephone calls come into the first mobile system 102, the virtual assistant system 110 may receive or intercept the call, identify the caller, and take appropriate action as discussed herein.

Alternately, the virtual assistant system 110 may work with the operating system. In one example, telephone calls come into the operating system of the mobile system 102. The virtual assistant system 110 may intercept the call (e.g., through a redirect function enabled through the operating system) or receive a hand-off of the call (e.g., through an API), to extend the mobile system's functionality. Similarly, voicemail functionality (including different voice prompts to different callers) may be provided by the virtual assistant system 110 by replacing a part of the operating system or working with a part of the operating system (e.g., through APIs).

FIG. 2 depicts a block diagram of an example virtual assistant system 110 according to some embodiments. The example virtual assistant system 110 includes a communication module 202, a management module 204, a registration module 206, an authentication module 208, a contact group module 210, an availability status module 212, a rules module 214, a location module 216, a scheduling module 218, an availability status module 212, and a contact group datastore 222.

It may be appreciated that all or part of the virtual assistant system 110 may be on the recipient's smart phone (e.g., communication device) or a system in communication with the recipient's communication device via the communication network 108.

In some embodiments, the communication module 202 sends and receives data and request(s) between any one of the modules or datastore of the virtual assistant system 110 to another of the modules or datastore of the virtual assistant system 110. The communication module 202 may send and receive data and request(s) between any of the modules or datastore of the virtual assistant system 110 and any of the systems of the environment 100 of FIG. 1.

The management module 204 may manage any number of modules of the virtual assistant system 110. In various embodiments, the management module 204 receives calls (e.g., directly from a smart device and/or by intercepting calls), determines the contact group of the caller using information from the contact group module 210, determines the availability status of the recipient using the availability status module 212, and executes the applicable rule(s) from the rules module 214.

In various embodiments, the registration module 206 creates and updates accounts for users of mobile system. For example, the management module 204 may receive a request to register a user of a mobile system, such as the first mobile system 102. The management module 204 may send the request to the registration module 206.

The registration module 206 may create and/or update account information for users. In some embodiments, the registration module 206 requires the user to include user identification information when registering a new account. User identification may include an email address, password, another email account(s) associated with the user, and phone number.

For example, the registration module 206 may allow a user to register and enables the authentication module 208 to authenticate the user's login and password. During a registration process, the user may provide their contact information to the virtual assistant system 110. In some embodiments, the contact information includes email account(s), unique identifiers, and/or phone numbers associated with the user.

The authentication module 208 may authenticate a user's login and password. The login and password may be associated with the user's account. The authentication module 208 may authenticate a user by comparing the user's login and password using a database of registered users. It may be appreciated that users may be authenticated in many ways, including, but not limited to, device identifiers, biometrics, encryption keys, cookies, and/or the like.

The contact group module 210 may categorize any number of the user's potential callers (e.g., from a user's contacts listing in the user's communication device) into one or more contact groups for use by the virtual assistant system 110. Each contact and/or contact group may be stored by the contact group module 210 into the contact group datastore 222 in the form of a contact entry. Each contact entry may include a name of the contact, a nickname of the contact, at least one phone number associated with the contact, and/or at least one label (e.g., a contact group identifier) for each phone number. The contact group identifier may identify any number of groups that the contact (e.g., potential caller) may belong.

In various embodiments, the contact group module 210 may identify contacts on the user's mobile device. For example, the contact group module 210 may send a request to the management module 204 to make an API call to the user's mobile system for the contacts in the user's mobile system's contact list. Further or alternately, the contact group module 210 may receive one or more designations from the user indicating one or more contacts and/or phone numbers to associate with any number of new or pre-existing contact groups.

In some embodiments, the contact group module 210 may receive from the user, customized labels (e.g., names or identifiers) for each of the multiple contact groups, or the user may choose to use default contact group labels. Some examples of labels for contact groups include "immediate family," "emergency," "friends," "business," "blocked," and/or "unlisted." It may be appreciated that the user may designate or change a contact group for any number of contacts. Further, the user may create any number of contact groups and identify them in any way they want (e.g., label each group individually in any way they like including different languages, emoticons, whimsical names, and/or the like).

Contact group membership may change as needed. For example, a user waiting to hear back from the doctor may add a phone number for the doctor's office to an "emergency" contact group. After a crisis resolves or after a particular call, the user may change the contact group associated by the doctor to another group (e.g., a "next appointment reminder" contact group or the like).

In some embodiments, a caller may belong to one or more contact groups. For example, a contact may be in the "friend" contact group as well as a "business colleague" contact group and/or "supervisor" contact group.

The availability status module 212 may be configured to create different availability statuses. An availability status refers to a state of the user that affects availability to be reached by one or more callers. In various embodiments, a user may identify any number of availability statuses including, for example, "free," "personal time," "in a meeting," "unavailable," or the like. The availability status module 212 may receive any number of availability statuses from the user and store the availability statuses.

In various embodiments, the virtual assistant system 110 may determine the availability status of the user when a caller calls. For example, the user may manually select a current availability status from an interface (e.g., selecting "in a meeting" prior to walking into a meeting). When a caller calls, the virtual assistant system 110 (e.g., the management module 204) may determine that the user is "in a meeting" and determine which contact group that the caller belongs. The virtual assistant system 110 may then execute a rule to take action based on the contact group and current availability status.

The rules module 214 is configured to create one or more rules based on the user's input. Each rule indicates one or more actions that the virtual assistant system 110 may take based on contact group and the recipient's availability status at the time of the call.

For example, the user may create a rule that indicates when a caller from the "emergency" contact group calls, the virtual assistant system 110 passes those calls directly to the user regardless of availability status. In another example, the user may create a rule that indicates when a caller from a "business colleague" contact group calls and the user is in the "business meeting" availability status, the virtual assistant system 110 may play a particular audio prompt to the caller.

There may be any number of audio prompts. For example, an audio prompt may indicate that the user is in a meeting and request any number of actions including, for example, that the caller leave a voicemail and a time when they are available for a return call, that the caller should call back later, that the caller should send a text to the user with a message, or that the caller should send an email. In some embodiments, based on the applicable rule (triggered by the caller's contact group and the recipient's availability status), the user's communication device provides an interactive system to enable the recipient to press a number if it is an emergency to enable the virtual assistant system 110 to pass the call through to the recipient in an emergency.

It may be appreciated that there may be any number of rules indicating different actions to take depending on the contact group and availability status. In various embodiments, the user may designate a default action to be taken if there are no rules that are applicable (e.g., the default action being to play a particular voice prompt to indicate to the caller to leave a voice or text message).

In some embodiments, the location module 216 determines the location of the recipient. The location module 216 may determine this information by sending an API request to the mobile system of the recipient to request the current location according to the global positioning system (GPS) of the mobile system. Based on the location information associated with the recipient, the availability status module 212 may determine an applicable availability status.

In various embodiments, the user may categorize different locations (e.g., based on GPS coordinates) and associate the different locations with different availability statuses. For example, the user may designate a "home" location and when location information indicates when the user is at home, the availability status of "personal" or "do not disturb" may be applied. Similarly, if the user designates a "gym" location and the user is at the gym, the availability status of "working out," "do not disturb," or "interruptions for work only" may be applied.

For example, if the user did not manually set an availability status and the virtual assistant system 110 receives a call, the availability status module 212 may retrieve location information from the location module 216. If the location information indicates that the user is at home, then the availability status module 212 may set the availability status to "personal" and apply rules based on that availability status and the recipient's contact group. If the location information indicates that the user is at the gym, then the availability status module 212 may set the availability status to "busy-personal" and apply rules based on that availability status and the recipient's contact group.

In some embodiments, the user may set a rule that when the location information indicates that the user is not within a particular geographic area (e.g., a range of GPS coordinates), then the user is associated with an availability status of "unavailable" or "on vacation." As such, there may be a rule that indicates that all calls or messages received while the user is geographically unavailable (e.g., not within a particular geographic area) may be directed to voicemail and/or converted to text and sent to text messages.

The scheduling module 218 may determine an availability status of the recipient and/or the availability for later communication based on the recipient's calendar. In various embodiments, the virtual assistant system 110 may check the recipient's calendar or other indication provided by the recipient to indicate a time that is convenient to the user or to make suggestions. For example, the virtual assistant system 110 may receive a text from a caller, the virtual assistant system 110 may determine the caller's contact group based on the caller's cell number, determine the recipient's availability status, identify the applicable predefined rule to determine that the recipient is not available, check the recipient's calendar or a predefined time for availability, and provide a text message back to the caller indicating when the recipient is available.

In some embodiments, the availability status module 212 may send a request to the scheduling module 218 for the current recipient schedule according to the scheduling module 218 (e.g., if the recipient's availability cannot be otherwise determined). The scheduling module 218 may receive and store a current availability manually provided by the recipient or check the recipient's calendar/schedule to determine if the user is currently in a meeting or is otherwise occupied within a time that is blocked off. Based on the calendar entry, the scheduling module 218 may determine the recipient's availability status. In some embodiments, the recipient may relate different calendar types (e.g., in a meeting, blocked off, away, or the like) with one or more availability statuses.

In some embodiments, the availability status module 212 may determine the availability status regardless of the availability status received from the scheduling module 218. For example, the availability status module 212 may receive a "work" status from the scheduling module 218; the availability status may set the current availability status to "work."

In some embodiments, the availability status module 212 may make an API request, via the management module 204, to more than one or more mobile devices, cloud scheduling services, and the like to determine the schedule of the recipient and, as a result, determine the availability status of the recipient. In various embodiments, the scheduling module 218 may make periodic calls to one or more scheduling applications, servers, services, cloud services, and/or the like to update the current availability status of the recipient. Additionally or alternately, the scheduling module 218 may make calls to one or more scheduling applications, servers, services, cloud services, and/or the like to update the current availability status of the recipient when someone tries to reach the recipient.

It may be appreciated that a user of the virtual assistant system 110 may purposefully identify times that may be provided to callers of one or more contact groups to call the recipient (e.g., by blocking times of the calendar as "free for calls"). Although this time may overlap other activities, the user may control the virtual assistant system 110 to provide that time to callers of one or more contact groups (e.g., a subset of contact groups but not all) to encourage them to call during these times. In this way, the user may control when they are likely to get important calls rather than getting all calls (important or otherwise) at any time.

It may be appreciated that the virtual assistant system 110 may communicate with callers using a voice prompt when they call. In some embodiments, the virtual assistant system 110 may communicate with callers using a text message when the caller sends a text message.

In various embodiments, the virtual assistant system 110 may communicate with the user to schedule a call via text message or using a message (or audio prompt) to provide information regarding availability and request a mutually convenient callback time.

In various embodiments, the virtual assistant system 110 may be interactive through text messages. When a call is received, for example, the management module 204 may provide a text message back to the caller indicating when the recipient is available and/or how the recipient would prefer to communicate (e.g., via text message or email rather than a voice call). In this example, after providing a text message back to the caller indicating when the recipient is available, the management module 204 may send a text message requesting whether a proposed time and/or date is agreeable to the recipient (e.g., by indicating that the user send a text with a number indicating that they may call at that time). If agreeable, the virtual assistant system 110 may input a calendar entry (using an API for a calendar application) for the recipient blocking off the time for a predefined duration (e.g., ten minutes by default or a duration based on the contact group). If that time is not available to the recipient, the recipient may text an indication (e.g., a different number or text) to the virtual assistant system 110 and the virtual assistant system 110 may check the recipient's calendar for a different time. The process may continue until an acceptable time is reached or the process is terminated.

In various embodiments, if the caller calls rather than provides a text message, the virtual assistant system 110 may provide an audio prompt to request the caller to leave a text message or an audio message for the recipient (e.g., not allowing the caller to leave an voice mail).

In various embodiments, the virtual assistant system 110 may rely on default rules that automatically connects a call to a recipient from a caller identified to be in the "emergency" contact group (e.g., from a school nurse, spouse, or surgeon) regardless of that caller's group.

In some embodiments, the management module 204 may use voice recognition of the caller's voice to determine if the caller is interested in setting a time for a future communication and/or provide the caller with an opportunity to indicated preferences based on numerical or vocal cues (e.g., by proving a prompt indicating that if the caller is interested in setting a time for a future call, the caller may input a numerical value such as "1" or say the word "one"). The management module 204 may check the recipient's calendar for an open, free, or otherwise designated time for calls and provide information by audio prompt back to the caller. The caller may then indicate if the time is acceptable or request a new time using their telephone keypad, vocal cues, or the like. If agreeable, the management module 204 may input a calendar entry (using an API for a calendar application) for the recipient blocking off the time for a predefined duration (e.g., ten minutes by default or a duration based on the contact group). If that time is not available to the recipient, the recipient may provide an audio prompt an indication to the caller. The virtual assistant system 110 may check the recipient's calendar for a different time. The process may continue until an acceptable time is reached or the process is terminated.

The automated message datastore 220 may include any number of audio prompts. In various embodiments, the virtual assistant system 110 may execute a rule based on the availability status of the recipient at a time of a call from the caller, and the caller's contact group. The rule may retrieve or present any number of previously generated audio prompts. One audio prompt, for example, may indicate that the recipient is unavailable. Another audio prompt may request that the particular caller provide a text message or send an email. Yet another audio prompt may include an interactive system where a caller may be asked to indicate if the call is an emergency and/or what times that the caller may be available for a return call.

The contact group datastore 222 may include any number of contact groups. As discussed herein, the user may create any number of contact groups. Each contact group may have a unique contact group identifier (relative to the other contact groups in the contact group datastore 222). Each contact group may be associated with any number of users.

The automated message datastore 220 and the contact group datastore 222 may include any type of storage in any type(s) of logical storage (e.g., databases, tables, or the like).

Figure 3:
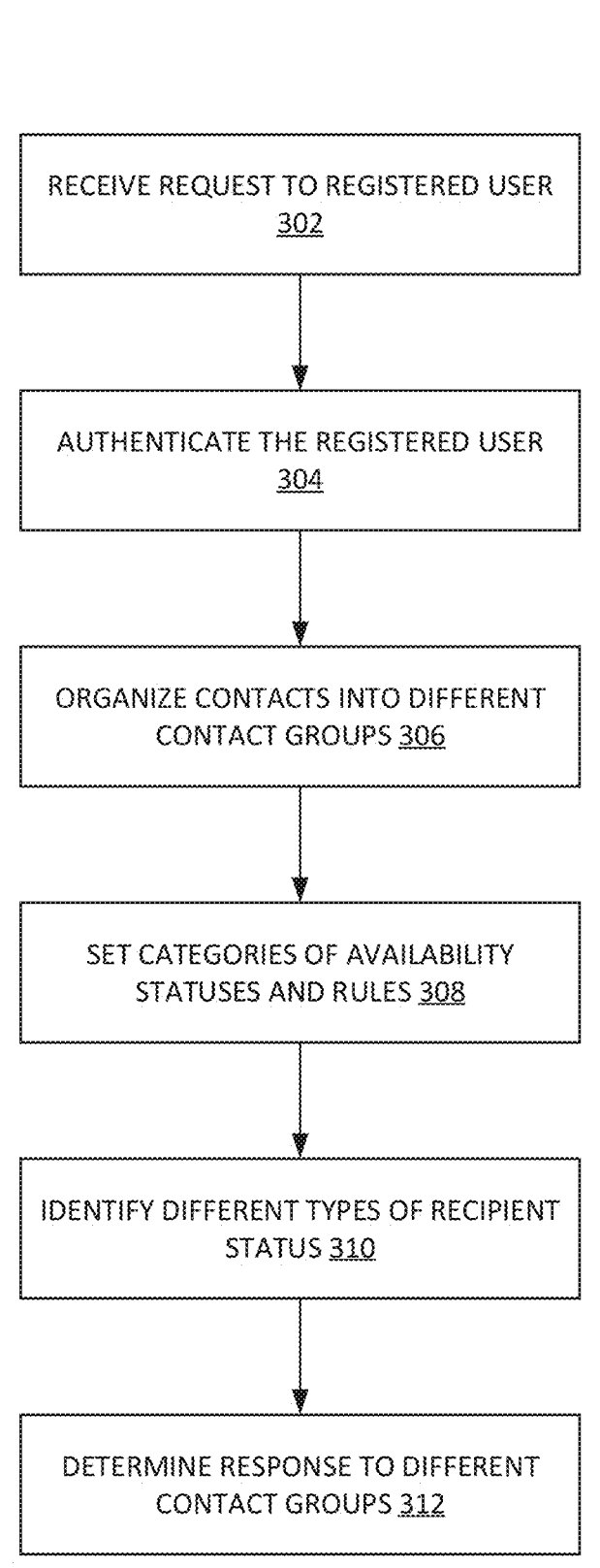
FIG. 3 depicts a flow chart of registration and authentication of users according to some embodiments.

FIG. 3 depicts a flow chart 300 of registration and authentication of users according to some embodiments. In step 302, the registration module 206 receives a request to register a user with the virtual assistant system 110. When a new user registers, a user identifier (e.g., a login identifier) and password may be required.

The registration module 206 may create or update account information for users. In some embodiments, the registration module 206 requires the user to include user identification information when registering a new account. User identification may include email address(es), password, and phone number. In some embodiments, the user may include information such as addresses for locations of interest to the user such as the workplace, home, gym, etc.

In step 304, the authentication module 208 authenticates a user's login and password when the user logs into the system. The login and password may be associated with the user's account. The authentication module 208 may authenticate a user by comparing the user's login and password with a database of registered users, passwords, and/or encryption keys. It may be appreciated that users may be authenticated in many ways, including, but not limited to, device identifiers, biometrics, encryption keys, cookies, and/or the like.

It may be appreciated that the virtual assistant system 110 may support multiple users of the same smart device with different profiles including different contact groups, different categories of availability statuses, different calendars, different audio prompts, different rules, and/or the like.

In step 304, the management module 204 may send a request to the contact group module 210 to categorize the user's contacts into one or more contact groups. Each contact may be stored in the contact group datastore 222 in the form of a contact entry. Each contact entry may include a name of the contact, a nickname of the contact, at least one phone number associated with the contact, and/or a label (e.g., identifier) for each phone number.

In step 306, the contact group module 210 may assist with the creation of categories for contact groups and assist with assigning one or more contacts into one or more different contact groups. It may be appreciated that the user may organize any number of users in the user's contacts or any other user with any number of contact groups. In some embodiments, the management module 204 may identify co-workers in the user's contacts (e.g., by place of work identified in the user's contacts) and associate them with a "work colleagues" group or the like. Similarly, the management module 204 may identify family, friends or the like based on data or metadata in the user's contact and group them accordingly. In some embodiments, the management module 204 may only associate potential callers based on manual input by the user (e.g., via an interface) and/or a combination of automatically and by user manual input.

Each contact may belong to more than one contact group. Different contact groups may have different priority. The virtual assistant system 110 may associate a higher priority of the one or more contact groups to determine the choices presented to the caller. In some embodiments, if a first contact belongs to a first contact group with a first priority and a second contact group with a second priority, the virtual assistant system 110 may determine an appropriate rule to apply based on whether the first or the second priority is higher (and/or utilize a default rule if the first and the second priority have the same level of prioritization and/or neither group of the call has a prioritization).

In step 308, the registered and authenticated user may set categories for different availability statuses and create one or more rules which apply when a caller is from different contact groups calls based on one or more availability statuses.

In some embodiments, the user may interact with a user interface of the virtual assistant system 110 to input recurring or one-time events which may be part of the user's day-to-day activities. For example, the user may set a rule which updates the recipient's status to "work" when the location module 216 determines that the recipient's mobile system, and thus the user, is at a location which corresponds with the recipient's work address. In some embodiments, the user may set a rule which updates the recipient's status to "driving" when the location module 216 determines that the recipient is driving. In some embodiments, an optional notification module may send a notification of the change to the user interface of the virtual assistant system 110.

Figure 10:
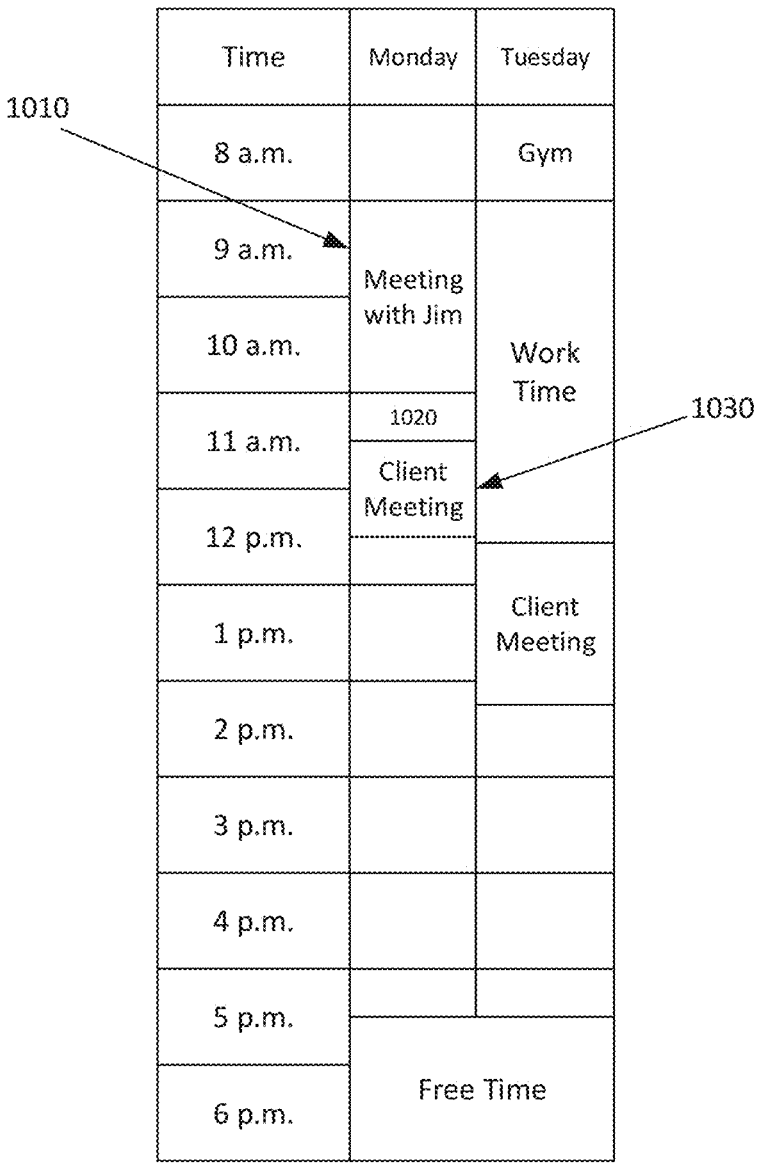
FIG. 10 depicts an example calendar of a user of a mobile system received by the virtual assistant system using an API according to some embodiments.

The user may send a request to the scheduling module 218 to schedule recurring or one-time events, such as weekly team meeting, or a dentist appointment. The scheduling module 218 may utilize the input from the user to populate an availability status calendar such as the availability status calendar 1100 as seen in FIG. 11. In some embodiments, the scheduling module 218 may send an API call to the calendar function of the mobile system via the management module 204. The output of the calendar function may be the calendar output 1000 as seen in FIG. 10. The scheduling module 218 may receive the calendar output 1000 to determine an availability status calendar such as the example availability status calendar 1100. When the virtual assistant system 110 detects an incoming call, the virtual assistant system 110 utilizes the availability status calendar 1100 to determine the current availability status of the call recipient.

When the virtual assistant system 110 determines that there is an incoming call, the management module 204 may identify a group that the caller belongs to and/or send a request to the availability status module 212 to determine the current availability status. For example, the availability status module 212 may determine that the current availability status is set to "do not disturb."

In some embodiments, callers associated with different groups may receive different prioritization based on the availability status of the recipient. In some embodiments, a first caller and a second caller may call the recipient at the same time and they may both have a rule that enables them to be directed to the recipient. In one example, a first caller may belong to an "immediate family" contact group and a second caller may belong to a "business" contact group. If the availability status is set to "personal," the first caller may have priority over the second caller, meaning that the first caller may be allowed to ring through to the recipient, while the second caller may be presented with a voicemail prompt. However, if the availability status is set to "work," the first caller may be presented with the voicemail prompt, and the second caller may be allowed to ring through.

In some embodiments, if a first contact belongs to a first contact group with a first priority and a second contact group with a second priority, the first priority being higher than the second priority. The management module 204 may allow the recipient to communicate with the first contact with responses available to members of the first contact group. Each contact entry may include a name of the contact, a nickname of the contact, and at least one phone number associated with the contact, and a label for each phone number. The contact group module 210 may send a request to the management module 204 to make an API call to the user's mobile system for the contacts in the user's mobile system's contact list.

In step 310, the availability status module 212 determines the current status of the recipient. The availability module 212 may update a current availability status of the recipient periodically or when a caller calls.

The recipient or user may designate or schedule periods during a day, a week, or a month to particular availability status. For example, the recipient may input their work hours, which is from 9 a.m. to 5:30 p.m., Monday to Friday. In some embodiments, the availability status module 212 may send a request to the management module 204 to make an API call to a calendar function of the user's mobile system. The calendar function may be used to determine appointments or scheduled meetings on the user's mobile device. In response to the API call request sent by the management module 204, the virtual assistant system 110 may receive event entries. Each event entry may include event properties from the user's mobile system. Event properties may include duration, other attendees of the event, the priority of the event, location, and the like. The scheduling module 218 may receive event entries along with their associated event properties and assign an availability status corresponding to the event entries. For example, the management module 204 sends an API call to the calendar function of the user's mobile system. In response, the scheduling module 218 may receive an event 1040. The scheduling module 218 may receive the event 1040 and determine that the event is a high priority and takes place on Tuesday from 12:30 p.m. to 1:15 p.m., and assign that time frame a status of "do not disturb." If the availability status module 212 sends a request to the scheduling module 218 during the Tuesday 12:30 p.m. to 1:15 p.m. time frame, the scheduling module 218 may send a "do not disturb" availability status to the availability status module 212.

When the virtual assistant system 110 determines that there is an incoming call from a first caller, the contact group module 210 may receive a request to determine if the caller ID associated with the first caller matches a contact entry in one of the multiple contact groups associated with the recipient. If the contact group module 210 determines that the first caller belongs to a "friends" contact group and a "business" contact group, the contact group module 210 may send a request to the availability status module 212 to determine the current status of the recipient. If the availability status module 212 determines that the availability status is current status is set to "free," the management module 204 may prioritize the "friends" contact group over the "business" contact group and present the different ways "friends can communicate with the recipient. For example, the user may set or determine the priority of one or more contact groups depending on the availability status. An example table 1400 of FIG. 14 depicts the priority of the various contact groups for different availability status. This table may be utilized by the management module 204 to determine responses associated with which contact group to output when the particular caller belongs to two contact groups. For example, if the particular caller belongs to both the "business" contact group and "friends" contact group, and if the availability status is set to "work," the management module 204 may prioritize the "business" contact group over the "friends" contact group. In other words, the management module 204 may output responses associated available to callers from the "business" contact group when the availability status is "work," which may be to allow the call to ring through to the recipient.

In step 312, the recipient may set up or configure the type of response available to a caller based at least on the availability status and the contact group that the caller belongs. In some embodiments, the recipient may set a rule. In various embodiments, the recipient may record and/or select audio prompts and/or text messages that may be played based on one or more rules.

The types of response may include allowing the call to ring through to the recipient, providing a voicemail prompt, or disconnecting the call. In various embodiments, the recipient may record customized voicemail prompts for the virtual assistant system 110 to present to the recipient. Recipients may have different voicemail prompts depending on the recipient's current status. In various embodiments, recipients may have different voicemail prompts for callers from different contact groups.

Figure 4:
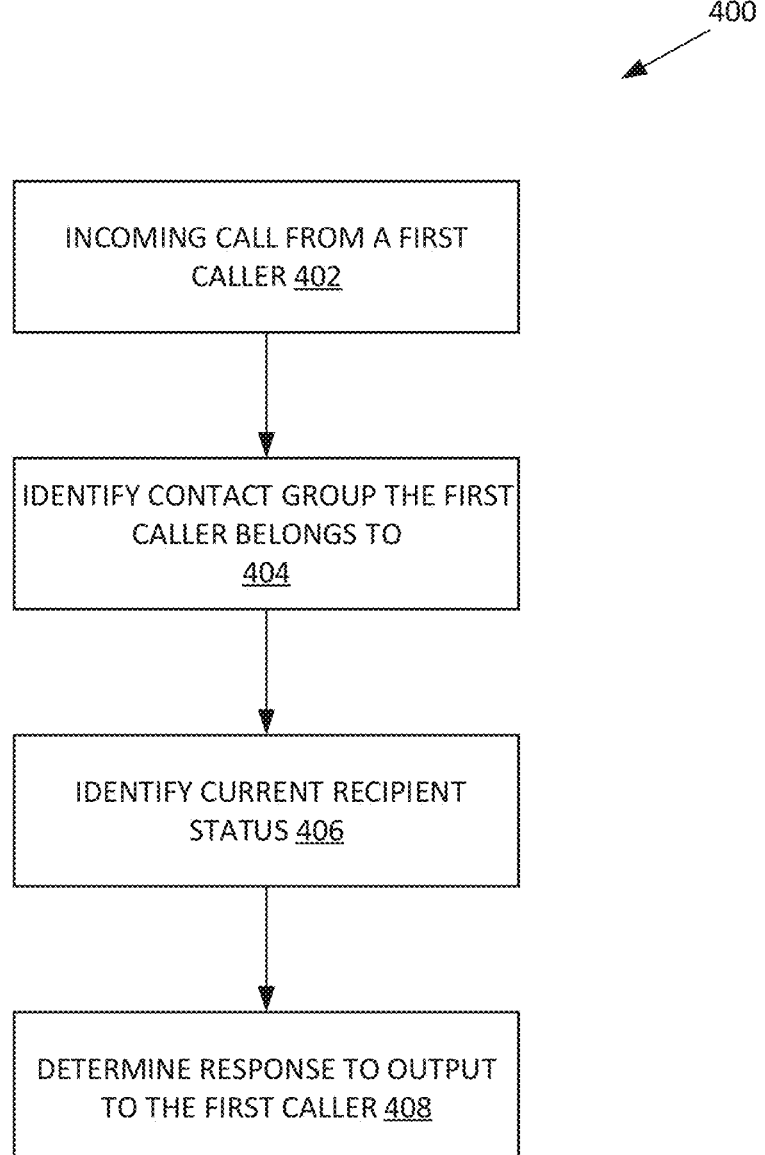
FIG. 4 depicts a flow chart depicting a method of determining the ways a caller can communicate with a recipient who utilizes the virtual assistant system according to some embodiments.

FIG. 4 depicts a method 400 of determining example ways a caller can communicate with a recipient according to some embodiments. In step 402, the recipient or user of the virtual assistant system 110 receives a telephone call from a caller on their mobile system, such as the first mobile system 102. The caller may be using a mobile system such as the second mobile system 104. In some embodiments, the virtual assistant system 110 may be installed in the second mobile system 104 as a software application. In various embodiments, there may be software installed on the second mobile system 104 that communicates with a virtual assistant system 110.

In step 404, the virtual assistant system 110 may receive, from the first mobile system 102, a caller ID. The contact group module 210 may determine one or more contact groups that the first caller belongs. In some embodiments, if the caller belongs to more than one contact group, the management module 204 may prioritize one contact group over another. For example, the contact group module 210 may determine, based at least one the caller ID associated with the caller, that the first caller belongs to the "immediate family" and "friends" contact groups. If the caller does not belong to a contact group, the caller may be treated as belonging to the "unknown contact group" and/or another default contact group which may receive the lowest priority (e.g., since the call could be a spam call). Further details of the responses outputted by the virtual assistant system 110 can be seen in FIGS. 5 through 9.

In step 406, management module 204 sends a request to the availability status module 212 for the recipient's current status. In various embodiments, the recipient (e.g., receiver of the call) may have manually set their status as "unavailable," "in a meeting," "personal time," "emergency contact only," or the like.

In various embodiments, the management module 204 may determine the availability status of the recipient automatically (e.g., based on calendar schedule, location, or the like). In some embodiments, the availability status module 212 may send a request to the scheduling module 218 for the current recipient schedule. The scheduling module 218 may retrieve information from a calendar (e.g., through an API) or request information from a calendar (e.g., on the mobile device) to determine any appointments or events within the calendar. The scheduling module 218 may be configured by the user to identify different status based on time and/or appointment. For example, if after work or after a particular time, the scheduling module 218 may identify the availability status as "personal time." If there is an appointment that is a work meeting (e.g., from a work calendar), then the scheduling module 218 may identify the availability status as "unavailable," "in a meeting," or the like.

If the scheduling module 218 does not have an availability status associated with the current time, the availability status module 212 may send a request to other modules of the virtual assistant system 110 the determine the availability status. In various embodiments, the availability status module 212 may send a request to the location module 216 for a current location of the recipient, the current location of the recipient may be used to determine the current availability status. For example, the availability status module 212 may receive from the location module 216 data, which indicates that the recipient is currently in a location which corresponds with the recipient's work address. In response to the availability status module 212 receiving this data, the availability status module 212 may determine that the current status of the recipient is "busy."

In another example, the location module 216 may determine or provide data indicating that the caller is running, in the car, or at the gym. The scheduling module 218 may provide one or more availability statuses based on the location of the recipient (e.g., if in the car, the availability status may be "limited" availability, and if at the gym, the availability status may be "unavailable but for emergencies"). In some embodiments, the availability status module 212 may send a request to the management module 204 to make an API request to one or more mobile devices associated with the recipient.

In step 408, the management module 204 determines response(s) to the call from the first caller. For example, from steps 404 and 406 as described above, the recipient's current status may be "busy at work," and the first caller belongs to the "immediate family" and "friends" contact groups. Since the first caller belongs to both groups, the management module 204 may determine that the "immediate family" contact group has priority over the "friends" contact group. The management module 204 may output a voicemail response to the caller from the "immediate family" contact group when the availability status is set to work, which may be output a voicemail prompt customized for immediate family members. In one example, the voicemail response may request that the caller text the caller if there is an emergency, input a number or other indication indicating that the call is urgent to interrupt the caller, or to leave a voicemail that may be heard soon.

Figure 5:
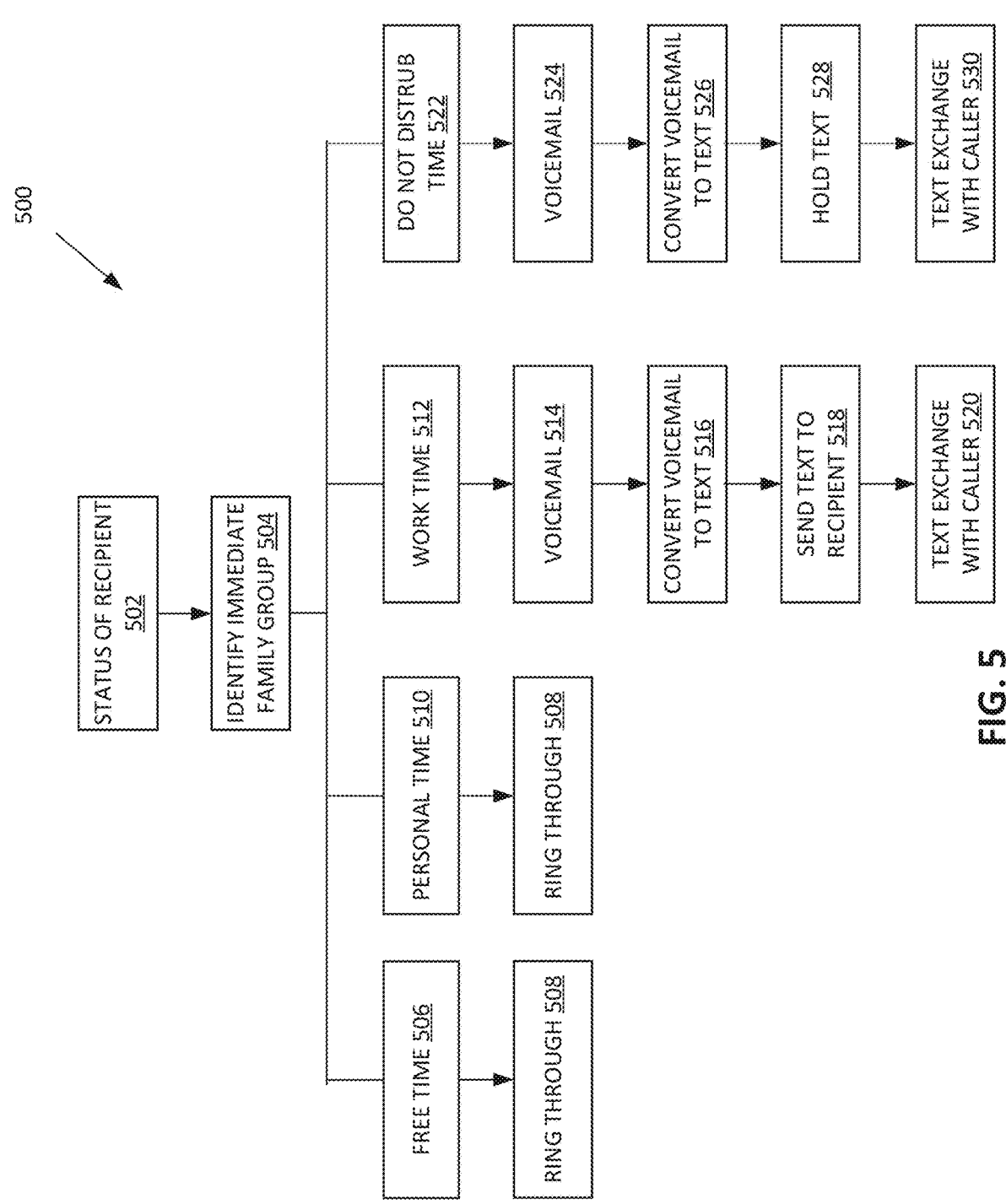
FIG. 5 depicts a flow chart of different ways the virtual assistant system may connect a recipient of a telephone call with the caller when the virtual assistant system determines that the caller belongs to an "immediate family" contact group according to some embodiments.

FIG. 5 depicts a method 500 of different ways the virtual assistant system 110 may respond to a telephone call according to some embodiments. In the illustrated figure, only one option is presented to the caller based on the status of the recipient and the contact group that the caller belongs. In various embodiments, the virtual assistant system 110 may present more than one option to the caller based on the status of the recipient and the contact group that the caller belongs.

In step 502, the virtual assistant system 110 detects an incoming call. Subsequently, the availability status module 212 determines the current status of the recipient. In one example, the availability status module 212 may send a request to the scheduling module 218 for the current availability status. If the scheduling module 218 does not have a availability status associated with the current time or a status that is set by the caller, the availability status module 212 may send a request to other modules of the virtual assistant system 110 the determine the availability status associated with the current time. In some embodiments, the scheduling module 218 sends the request to other modules of the virtual assistant system 110 to determine the availability status associated with the current time.

In step 504, the contact group module 210 determines that the caller belongs to the "immediate family" contact group.

In step 506, the availability status module 212 determines that the availability status is "free."

In step 508, based on a rule established by the recipient, the virtual assistant system 110 allows the call to ring through to the recipient. If the recipient does not choose to pick up the call, the virtual assistant system 110 may output a first voicemail prompt requesting that the caller leave an audio message. A voice-to-text module (not depicted) of the virtual assistant system 110 may capture the audio message from the caller and convert the captured audio into text form. In some embodiments, the text message containing the audio-to-text conversion of the audio message left by the caller may be sent to the recipient. In various embodiments, the text message may be held for a predetermined hold period before sending the text message to the recipient. In some embodiments, the predetermined hold period depends on the availability status and/or the contact group that the caller belongs. For example, the predetermined hold period for the text message may be shorter when the recipient is set to "free" status (e.g., the text may be delivered immediately or set to deliver with other texts at predetermined times such as every half hour) compared to "personal" status (e.g., the text may be delivered after hour).

Subsequent exchanges between the first caller and the first recipient may be accomplished by a text messaging function of the virtual assistant system 110. The text messaging function may be accomplished by the texting module. In some embodiments, the caller may receive the text message in the caller's mobile system's texting software application. In various embodiments, the caller may receive the text message in a texting function which is integrated into the virtual assistant system.

In step 510, the availability status module 212 determines that the availability status is set to "personal." In response to the availability status module 212 determining that the availability status is set to "personal," the method 500 proceeds to step 508. In step 508, as discussed herein, the virtual assistant system 110 allows the call to ring through to the recipient.

In step 512, the availability status module 212 determines that the availability status is set to "work." In response to the availability status module 212 determining that the availability status is set to "work," the method 500 proceeds to step 514. In step 514, the virtual assistant system 110 may send a request to the automated message datastore 220 to output a voicemail prompt requesting that the caller leave an audio message. The voicemail prompt may include a customized or personalized audio prompt.

In step 516, an optional voice-to-text module of the virtual assistant system 110 may capture the audio message from the caller and convert the captured audio into a text message. In some embodiments, the text message may be held by an optional texting module of the virtual assistant system 110 for a predetermined hold period. The predetermined hold period may be based on the availability status and/or the contact group that the caller belongs. For example, the predetermined hold period when the availability status is set to work may be shorter than the predetermined hold period when the availability status is set to do not disturb ("DND").

In some embodiments, the texting module may hold the text message until the recipient's status is no longer DND. As seen in an example table 1500 from FIG. 15, text messages from members of the "immediate family" contact group are held when the availability status is work or DND.

In step 518, the texting module may send the captured audio from the caller in text form to the recipient. In some embodiments, the caller may receive the text message in the caller's mobile system's texting software application or through SMS or any other texting application. In various embodiments, the caller may receive the text message in a texting function which is integrated into the virtual assistant system 110.

In step 520, the caller may respond to the recipient's message with another text message. Subsequent exchanges between the caller and the recipient may be accomplished by a text messaging function of the virtual assistant system 110. The exchange of messages between the first caller and the first recipient may be used to set up a mutually convenient callback time or to schedule a meeting between the first caller and the first recipient. In some embodiments, the texting module may send a request to the scheduling module 218 to determine time frames in the recipient's schedule when the recipient is available for a meeting or a call with the first caller. In various embodiments, the management module 204 to make an API call to the first caller's mobile system to determine time frames in the recipient's schedule when the recipient is available for a meeting or a call with the first caller. The texting module may receive multiple time frames, or periods when the recipient is available, and send them to the first caller.

In step 522, the availability status module 212 determines that the availability status is set to "do not disturb" ("DND"). In response to the availability status module 212 determining that the availability status is set to "DND," the method 500 proceeds to step 524. In step 524, the virtual assistant system 110 may output a voicemail prompt requesting that the caller leave an audio message. The second voicemail prompt may include a customized, or personalized audio prompt. In some embodiments, the second voicemail prompt may be different from the third voicemail prompt. In various embodiments, the second voicemail prompt is the same as the third voicemail prompt.

In step 526, the voice-to-text module may capture the audio message from the caller and convert the captured audio into text form. In step 528, the texting module may hold the text of the captured audio until the recipient's status is no longer "DND." In some embodiments, the text message may be held by the texting module for the predetermined hold period. The predetermined hold period may be based on the availability status and/or the contact group that the caller belongs. For example, the predetermined hold period when the availability status is set to work may be shorter than the predetermined hold period when the availability status is set to DND. In some embodiments, the texting module may hold the text message until the recipient's status is no longer "DND." As seen in an example table 1500 from FIG. 15, text messages from members of the "immediate family" contact group are held when the availability status is work or "DND."

In step 530, similar to step 520, the caller responds to the recipient's message with another text message. Subsequent exchanges between the caller and the recipient may be accomplished by a text messaging function of the virtual assistant system 110.

Figure 6:
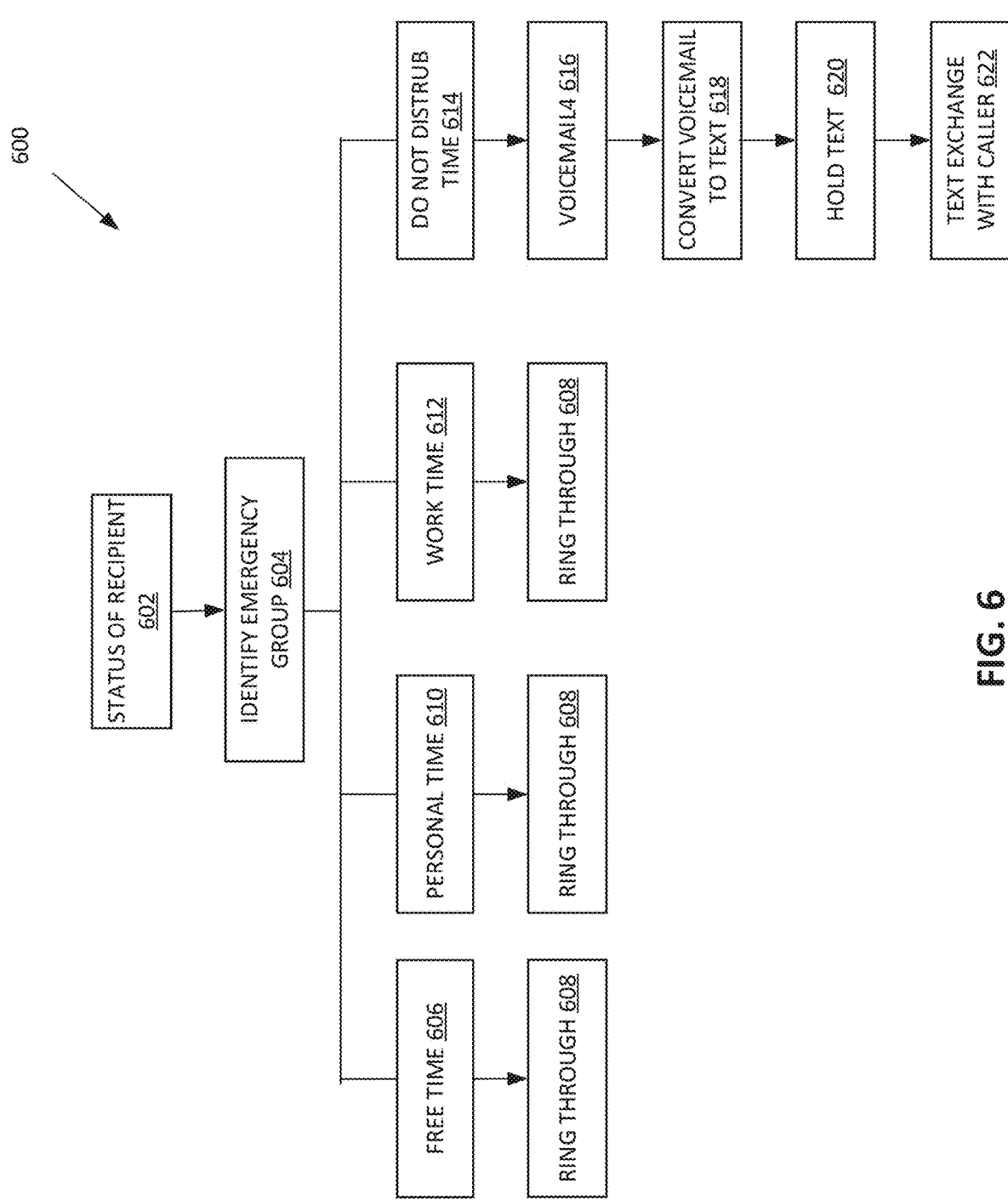
FIG. 6 depicts a flow chart of different ways the virtual assistant system may connect a recipient of a telephone call with the caller when the virtual assistant system determines that the caller belongs to an "emergency" contact group according to some embodiments.

FIG. 6 depicts a method 600 of different ways the virtual assistant system may connect a recipient of a telephone call with the caller according to some embodiments. In the illustrated figure, only one option is presented to the caller based on the status of the recipient and the contact group that the caller belongs. In various embodiments, the virtual assistant system 110 may present more than one option.

In step 602, similar to step 502, the virtual assistant system 110 detects an incoming call. Subsequently, the availability status module 212 determines the current status of the recipient. In some embodiments, the availability status module 212 sends a request to the scheduling module 218 for the current availability status. If the scheduling module 218 does not have an availability status associated with the current time, the availability status module 212 may send a request to other modules of the virtual assistant system 110 the determine the availability status associated with the current time. In some embodiments, the scheduling module 218 sends the request to other modules of the virtual assistant system 110 to determine the availability status associated with the current time.

In step 604, the contact group module 210 determines that the caller belongs to the "emergency" contact group, this may be done by comparing the caller ID with a contact entry in the "emergency" contact group.

In step 606, the availability status module 212 determines that the availability status is "free."

In step 608, the virtual assistant system 110 allows the call to ring through to the recipient. If the recipient does not choose to pick up the call, the virtual assistant system 110 may output the first voicemail prompt requesting that the caller leave an audio message. The optional voice-to-text module may capture the audio message from the caller and convert the captured audio into text form. In some embodiments, the text message containing the audio-to-text conversion of the audio message left by the caller may be sent to the recipient with little to no delay. In various embodiments, the text message may be held for a predetermined hold period. The predetermined hold period before sending the text message to the recipient depends on the availability status and/or the contact group that the caller belongs. For example, the predetermined hold period for the text message may be shorter when the recipient is set to "free" status compared to "personal" status.

In step 610, the availability status module 212 determines that the availability status is set to "personal." In response to the availability status module 212 determining that the availability status is set to "personal," the method 600 proceeds to step 608 (i.e., the virtual assistant system 110 allows the call to ring through to the recipient).

In step 612, the availability status module 212 determines that the availability status is set to "work." In response to the availability status module 212 determining that the availability status is set to "work," the method 600 proceeds to step 608, the virtual assistant system 110 allows the call to ring through to the recipient.

In step 614, the availability status module 212 determines that the availability status is set to "DND." In response to the availability status module 212 determining that the availability status is set to "DND," the method 600 proceeds to step 616. In step 616, the virtual assistant system 110 may output a voicemail prompt requesting that the caller leave an audio message. The voicemail prompt may include a customized or personalized audio prompt.

In step 618, the optional voice-to-text module may capture the audio message from the caller and convert the captured audio into text form. In step 620, the optional texting module may hold the text of the captured audio until the recipient's status is no longer "DND." In some embodiments, the text message may be held by the texting module for a predetermined hold period. The predetermined hold period may be based on the availability status and/or the contact group that the caller belongs. For example, the predetermined hold period when the availability status is set to "free" may be shorter than the predetermined hold period when the availability status is set to "DND." In some embodiments, the texting module may hold the text message until the recipient's status is no longer "DND." As seen in an example table 1500 from FIG. 15, text messages from members of the "emergency" contact group are held when the availability status is work or "DND."

In step 622, the caller may respond to the recipient's message with another text message. Subsequent exchanges between the caller and the recipient may be accomplished by a text messaging function of the virtual assistant system 110. The exchange of messages between the first caller and the first recipient may be used to set up a mutually convenient callback time or to schedule a meeting between the first caller and the first recipient. In some embodiments, the texting module may send a request to the scheduling module 218 to determine time frames in the recipient's schedule when the recipient is available for a meeting or a call with the first caller. In various embodiments, the management module 204 may make an API call to the first caller's mobile system to determine time frames in the recipient's schedule when the recipient is available for a meeting or a call with the first caller. The texting module may receive multiple time frames, or time periods when the recipient is available, and send them to the first caller.

Figure 7:
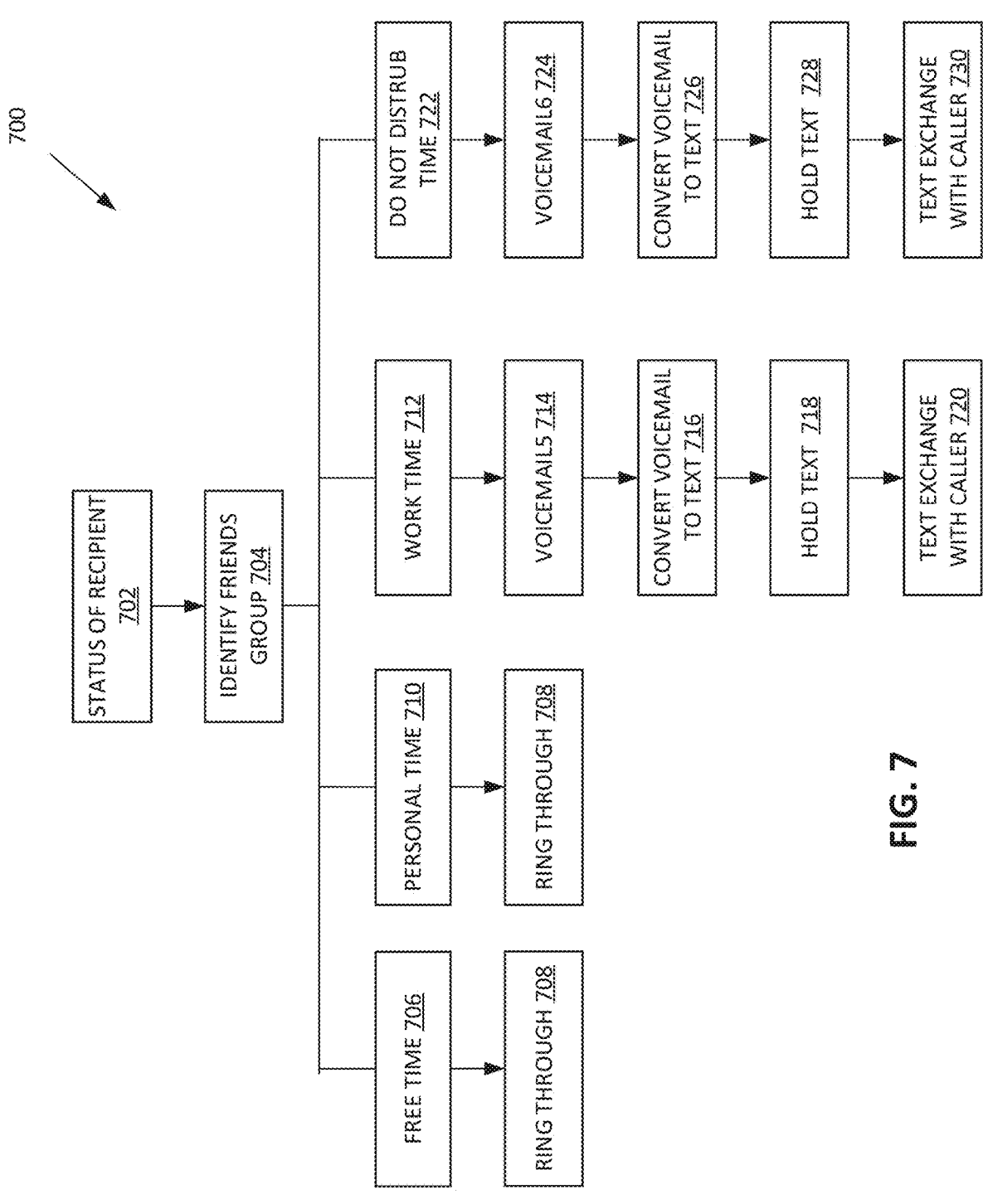
FIG. 7 depicts a flow chart of different ways the virtual assistant system may connect a recipient of a telephone call with the caller when the virtual assistant system determines that the caller belongs to a "friends" contact group according to some embodiments.

FIG. 7 depicts a method 700 of different ways the virtual assistant system may connect a recipient of a telephone call with the caller when the virtual assistant system determines that the caller belongs to a "friends" contact group according to some embodiments.

In step 702, similar to step 502, the virtual assistant system 110 detects an incoming call. Subsequently, the availability status module 212 determines the current status of the recipient. As mentioned previously, the availability status module 212 sends a request to the scheduling module 218 for the current availability status. If the scheduling module 218 does not have an availability status associated with the current time, the availability status module 212 may send a request to other modules of the virtual assistant system 110 the determine the availability status associated with the current time. In some embodiments, the scheduling module 218 sends the request to other modules of the virtual assistant system 110 to determine the availability status associated with the current time.

In step 704, the contact group module 210 determines that the caller belongs to the "friends" contact group, this may be done by comparing the caller ID with a contact entry in "friends" contact group.

In step 706, the availability status module 212 determines that the availability status is "free."

In step 708, the virtual assistant system 110 allows the call to ring through to the recipient. If the recipient does not choose to pick up the call, the virtual assistant system 110 may output the first voicemail prompt requesting that the caller leave an audio message. The voice-to-text module may capture the audio message from the caller and convert the captured audio into text form. In some embodiments, the text message containing the audio-to-text conversion of the audio message left by the caller may be sent to the recipient with little to no delay. In various embodiments, the text message may be held for a predetermined hold period. The predetermined hold period before sending the text message to the recipient depends on the availability status and/or the contact group that the caller belongs. For example, the predetermined hold period for the text message may be shorter when the recipient is set to a "free" status compared to "personal" status.

In step 710, the availability status module 212 determines that the availability status is set to "personal." In response to the availability status module 212 determining that the availability status is set to "personal," the method 700 proceeds to step 708. In step 708, the virtual assistant system 110 allows the call to ring through to the recipient.

In step 712, the availability status module 212 determines that the availability status is set to "work." In response to the availability status module 212 determining that the availability status is set to "work," the method 600 proceeds to step 714. In step 714, the virtual assistant system 110 may send a request to the automated message datastore 220 to output a voicemail prompt requesting that the caller leave an audio message.

In step 716, the voice-to-text module may capture the audio message from the caller and convert the captured audio into a text message.

In step 718, the text message is held by the texting module for the predetermined hold period. The predetermined hold period may be based on the availability status and/or the contact group that the caller belongs. For example, the predetermined hold period when the availability status is set to "work" may be longer than the predetermined hold period when the availability status is set to "personal." In some embodiments, the texting module may hold the text message until the recipient's status is no longer set to "work." As seen in an example table 1500 from FIG. 15, text messages from members of the "friends" contact group are held when the availability status is set to work or "DND."

In step 720, the caller may respond to the recipient's message with another text message. Subsequent exchanges between the caller and the recipient may be accomplished by a text messaging function of the virtual assistant system 110. The exchange of messages between the first caller and the first recipient may be used to set up a mutually convenient callback time or to schedule a meeting between the first caller and the first recipient. In some embodiments, the texting module may send a request to the scheduling module 218 to determine time frames in the recipient's schedule when the recipient is available for a meeting or a call with the first caller. In various embodiments, the management module 204 to make an API call to the first caller's mobile system to determine time frames in the recipient's schedule when the recipient is available for a meeting or a call with the first caller. The texting module may receive multiple time frames, or time periods when the recipient is available, and send them to the first caller.

In step 722, the availability status module 212 determines that the availability status is set to "DND." In response to the availability status module 212 determining that the availability status is set to "DND," the method 700 proceeds to step 724. In step 724, the virtual assistant system 110 may output a voicemail prompt requesting that the caller leave an audio message. The voicemail prompt may include a customized or personalized audio prompt.

In step 726, the voice-to-text module may capture the audio message from the caller and convert the captured audio into text form. In step 728, the texting module may hold the text of the captured audio until the recipient's status is no longer "DND." In some embodiments, the text message may be held by the texting module for the predetermined hold period. The predetermined hold period may be based on the availability status and/or the contact group that the caller belongs. For example, the predetermined hold period when the availability status is set to "personal" may be shorter than the predetermined hold period when the availability status is set to "DND." In some embodiments, the texting module may hold the text message until the recipient's status is no longer "DND." As seen in an example table 1500 from FIG. 15, text messages from members of the "friends" contact group are held when the availability status is work or "DND."

In step 730, the caller may respond to the recipient's message with another text message. Subsequent exchanges between the caller and the recipient may be accomplished by a text messaging function of the virtual assistant system 110. The exchange of messages between the first caller and the first recipient may be used to set up a mutually convenient callback time or to schedule a meeting between the first caller and the first recipient. In some embodiments, the texting module may send a request to the scheduling module 218 to determine time frames in the recipient's schedule when the recipient is available for a meeting or a call with the first caller. In various embodiments, the management module 204 to make an API call to the first caller's mobile system to determine time frames in the recipient's schedule when the recipient is available for a meeting or a call with the first caller. The texting module may receive multiple time frames, or time periods when the recipient is available, and send them to the first caller.

Figure 8:
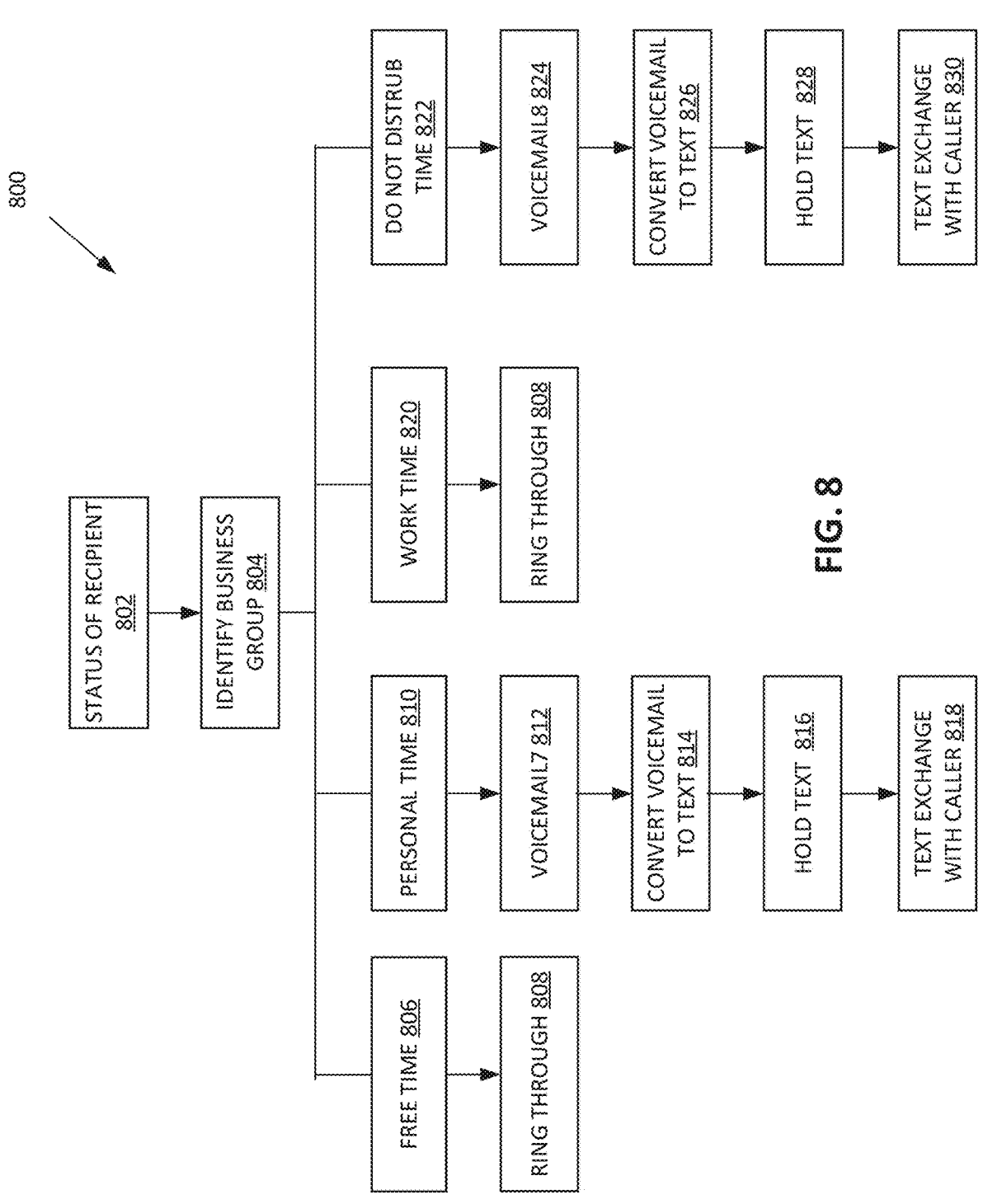
FIG. 8 depicts a flow chart of different ways the virtual assistant system may connect a recipient of a telephone call with the caller when the virtual assistant system determines that the caller belongs to a "business" contact group according to some embodiments.

FIG. 8 depicts a method 800 of different ways the virtual assistant system may connect a recipient of a telephone call with the caller when the virtual assistant system determines that the caller belongs to a "business" contact group according to some embodiments. In the illustrated figure, only one option is presented to the caller based on the status of the recipient and the contact group that the caller belongs. In various embodiments, the virtual assistant system 110 may present more than one option to the caller based on the status of the recipient and the contact group that the caller belongs.

In step 802, similar to step 502, the virtual assistant system 110 detects an incoming call. Subsequently, the availability status module 212 determines the current status of the recipient. As mentioned previously, the availability status module 212 sends a request to the scheduling module 218 for the current availability status. If the scheduling module 218 does not have an availability status associated with the current time, the availability status module 212 may send a request to other modules of the virtual assistant system 110 the determine the availability status associated with the current time. In some embodiments, the scheduling module 218 sends the request to other modules of the virtual assistant system 110 to determine the availability status associated with the current time.

In step 804, the contact group module 210 determines that the caller belongs to the "business" contact group, this may be done by comparing the caller ID with contact entries in the "business" contact group.

In step 806, the availability status module 212 determines that the availability status is "free." In response to the availability status module 212 determining that the availability status is set to "free," the method 600 proceeds to step 808. In step 808, the virtual assistant system 110 allows the call to ring through to the recipient. If the recipient does not choose to pick up the call, the virtual assistant system 110 may output the first voicemail prompt requesting that the caller leave an audio message. The voice-to-text module may capture the audio message from the caller and convert the captured audio into text form. In some embodiments, the text message containing the audio-to-text conversion of the audio message left by the caller may be sent to the recipient with little to no delay. In various embodiments, the text message may be held for a predetermined hold period. The predetermined hold period before sending the text message to the recipient depends on the availability status and/or the contact group that the caller belongs. For example, the predetermined hold period for the text message may be shorter when the recipient is set to the "free" status compared to the "personal" status.

In step 810, the availability status module 212 determines that the availability status is set to "personal." In response to the availability status module 212 determining that the availability status is set to personal, the method 800 proceeds to step 812. In step 812, the virtual assistant system 110 may send a request to the automated message datastore 220 to output a voicemail prompt requesting that the caller leave an audio message. The seventh voicemail prompt may include a customized or personalized audio prompt.

In step 814, the voice-to-text module may capture the audio message from the caller and convert the captured audio into a text message.

In step 816, the text message is held by the texting module for the predetermined hold period. The predetermined hold period may be based on the availability status and/or the contact group that the caller belongs. For example, the predetermined hold period when the availability status is set to work may be longer than the predetermined hold period when the availability status is set to personal. In some embodiments, the texting module may hold the text message until the recipient's status is no longer set to "work." As seen in an example table 1500 from FIG. 15, text messages from members of the "friends" contact group are held when the availability status is set to "work" or "DND."

In step 818, the caller may respond to the recipient's message with another text message. Subsequent exchanges between the caller and the recipient may be accomplished by a text messaging function of the virtual assistant system 110. The exchange of messages between the first caller and the first recipient may be used to set up a mutually convenient callback time or to schedule a meeting between the first caller and the first recipient. In some embodiments, the texting module may send a request to the scheduling module 218 to determine time frames in the recipient's schedule when the recipient is available for a meeting or a call with the first caller. In various embodiments, the management module 204 to make an API call to the first caller's mobile system to determine time frames in the recipient's schedule when the recipient is available for a meeting or a call with the first caller. The texting module may receive multiple time frames, or time periods when the recipient is available, and send them to the first caller.

In step 820, the availability status module 212 determines that the availability status is set to "work." In response to the availability status module 212 determining that the availability status is set to "work," the method 600 proceeds to step 808. In step 808, the virtual assistant system 110 allows the call to ring through to the recipient.

In step 822, the availability status module 212 determines that the availability status is set to "DND." In response to the availability status module 212 determining that the availability status is set to "DND," the method 700 proceeds to step 824, the virtual assistant system 110 may output an eighth voicemail prompt requesting that the caller leave an audio message. The voicemail prompt may include a customized or personalized audio prompt.

In step 826, the voice-to-text module may capture the audio message from the caller and convert the captured audio into text form. In step 828, the texting module may hold the text of the captured audio until the recipient's status is no longer "DND." In some embodiments, the text message may be held by the texting module for the predetermined hold period. The predetermined hold period may be based on the availability status and/or the contact group that the caller belongs. For example, the predetermined hold period when the availability status is set to "personal" may be shorter than the predetermined hold period when the availability status is set to "DND." In some embodiments, the texting module may hold the text message until the recipient's status is no longer "DND."

In step 830, the caller may respond to the recipient's message with another text message. Subsequent exchanges between the caller and the recipient may be accomplished by a text messaging function of the virtual assistant system 110. The exchange of messages between the first caller and the first recipient may be used to set up a mutually convenient callback time or to schedule a meeting between the first caller and the first recipient. In some embodiments, the texting module may send a request to the scheduling module 218 to determine time frames in the recipient's schedule when the recipient is available for a meeting or a call with the first caller. In various embodiments, the management module 204 to make an API call to the first caller's mobile system to determine time frames in the recipient's schedule when the recipient is available for a meeting or a call with the first caller. The texting module may receive multiple time frames, or periods when the recipient is available, and send them to the first caller.

Figure 9:
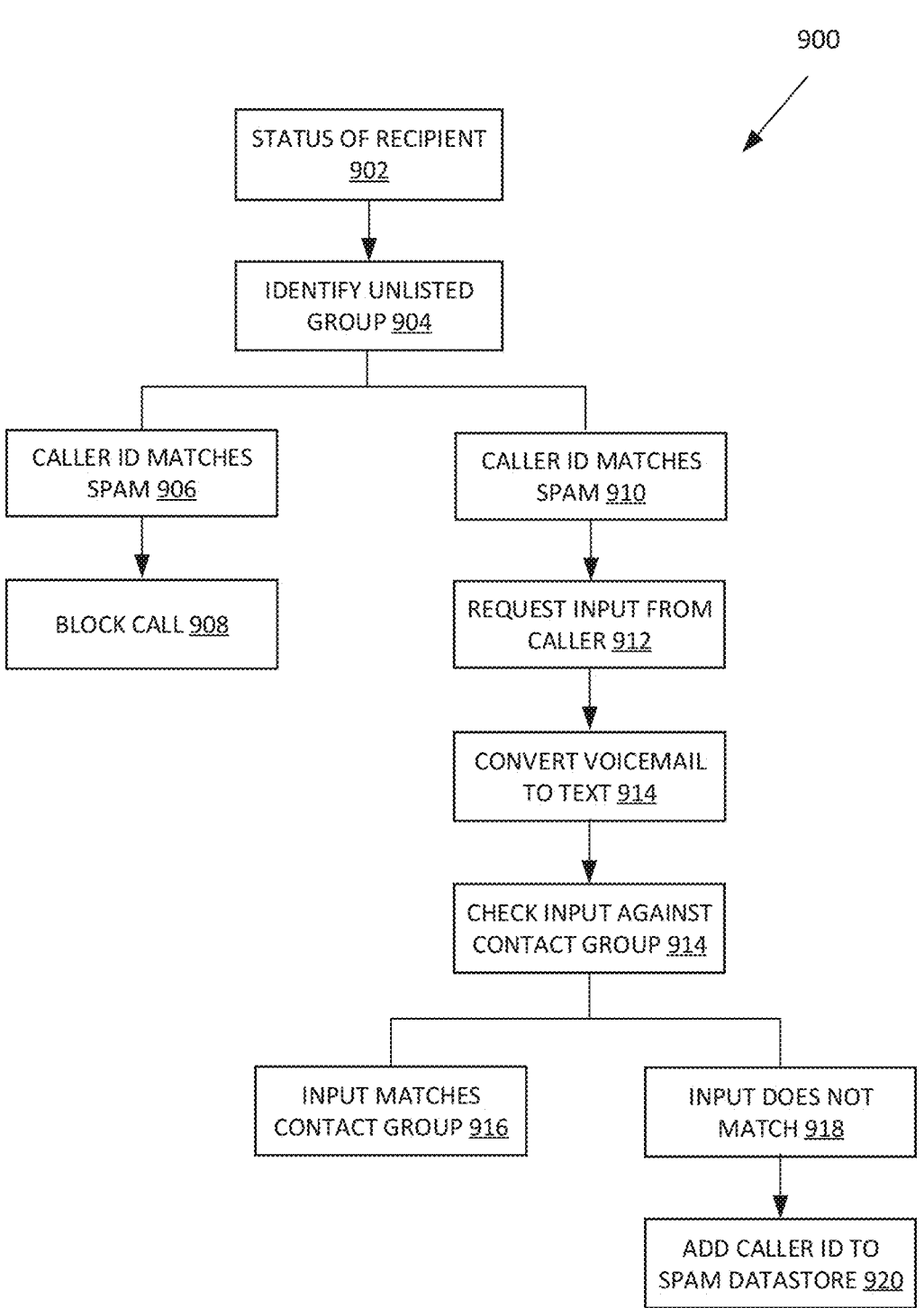
FIG. 9 depicts a flow chart of different ways the virtual assistant system may connect a recipient of a telephone call with the caller when the virtual assistant system determines that the caller belongs to a "blocked" or "unlisted" contact group according to some embodiments.

FIG. 9 depicts a method 900 of different ways the virtual assistant system may connect a recipient of a telephone call with the caller when the virtual assistant system determines that the caller belongs to a "blocked" or "unlisted" contact group according to some embodiments. In the illustrated figure, only one option is presented to the caller based on the status of the recipient and the contact group that the caller belongs. In various embodiments, the virtual assistant system 110 may present more than one option to the caller based on the status of the recipient and the contact group that the caller belongs.

In step 902, similar to step 902, the virtual assistant system 110 detects an incoming call. Subsequently, the availability status module 212 determines the current status of the recipient. As mentioned previously, the availability status module 212 sends a request to the scheduling module 218 for the current availability status. If the scheduling module 218 does not have a availability status associated with the current time, the availability status module 212 may send a request to other modules of the virtual assistant system 110 the determine the availability status associated with the current time. In some embodiments, the scheduling module 218 sends the request to other modules of the virtual assistant system 110 to determine the availability status associated with the current time.

In step 904, the contact group module 210 determines that the caller belongs to the "blocked" or "unlisted" contact group. The determination may be done by comparing the caller ID with a contact entry in "blocked" or "unlisted" contact group. The management module 204 sends a request to the spam caller datastore 112 to determine if the caller ID of the caller is a scam caller or spam caller. With the advancing telephone number spoofing technologies, scammers or spammers may spoof the phone numbers to hide the real caller ID of the scammer or spammer. The spam caller datastore 112 may store the caller IDs of suspected scam callers. The virtual assistant system 110 may keep count of the number of times a particular caller ID shows up as an entry in the spam caller datastore 112. The virtual assistant system 110 may determine that at the particular caller ID is not a suspected scam caller if the number of times the particular caller ID shows up as an entry in the spam caller datastore 112 more than a predetermined number of times (e.g., over a predetermined period of time such as within an hour or repeatedly over weeks or months).

In step 906, the contact group module 210 receives, from the spam caller datastore 112, confirmation that the caller ID of the caller matches a spam caller. In response to the contact group module 210 receiving data that the caller is a spam caller, step 908 may proceed. In step 908, the virtual assistant system 110 may block or disconnect the call.

In step 910, the contact group module 210 receives, from the spam caller datastore 112, that the caller ID of the caller does not match an entry of the spam caller datastore 112. In response to this, step 912 may proceed. In step 912, the virtual assistant system 110 may request a second caller to input the phone number they usually call. In some embodiments, the input may be an audio form. For example, the management module 204 may output an audio prompt requesting that the second caller record an audio message of the phone number that the second caller usually calls, this may be useful in cases when a second caller is not using their mobile device to make a phone call. The virtual assistant system 110 gives the second caller a chance to communicate with the recipient, even though the second caller is not calling from their mobile system.

In various embodiments, the input may be in text form. For example, the texting module may send a request to the second caller to input, in the form of a text message, the phone number they usually call. In such an embodiment, step 914 may be skipped.

In step 914, the voice-to-text module converts the audio message of the phone number that the second caller usually calls into text form.

In step 916, the contact group module 210 compares the text form of the phone number the second caller usually calls from with the contact entries stored in the contact group datastore 222 to determine if the second caller belongs to one or more contact groups of the recipient. If the second belongs to one or more contact groups, the virtual assistant system 110 may determine the response that the virtual assistant system 110 may send to the caller. For example, if step 916 determines that the second caller belongs to the "emergency" contact group, and the status of the recipient is determined in step 902 to be "free," then, according to FIG. 6, the response to present to the second caller is step 608 of FIG. 6, and the virtual assistant system 110 may allow the call from the second caller to ring through to the recipient.

In step 918, in the case where the contact group module 210 cannot find a match for one of the contact entries stored in the contact group datastore 222.

In step 920, the management module may send a request to the spam caller datastore 112 to store the caller ID of the second caller to a list of suspected scam callers. In some embodiments, the contact group datastore 222 stores the list of suspected scam callers. The virtual assistant system 110 may keep count of the number of times a particular caller ID shows up as an entry in the spam caller datastore 112. The virtual assistant system 110 may determine that at the particular caller ID is not a suspected scam caller if the number of times the particular caller ID shows up as an entry in the spam caller datastore 112 more than a predetermined number of times.

Figure 12:
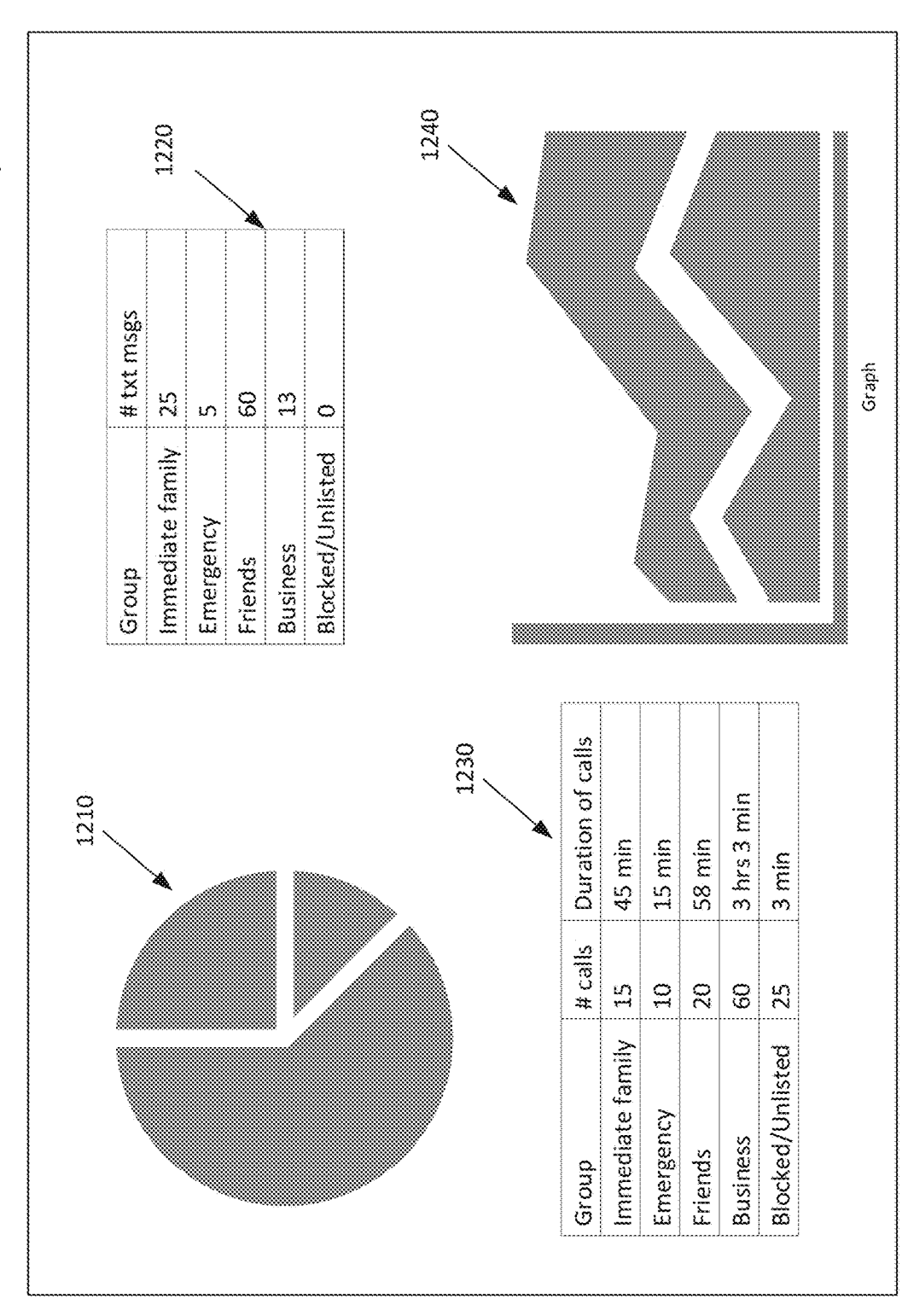
FIG. 12 depicts an example summary user interface summarizing key statistics of the recipient's use of the virtual assistant system, according to some embodiments.

FIG. 12 depicts an example summary user interface 1200 summarizing key statistics of the recipient's use of the virtual assistant system, according to some embodiments. The summary user interface 1200 includes a pie chart 1210, tables 1220 and 1230, and a graph 1240. The pie chart 1210 illustrates a portion of time the recipient has set the virtual assistant system 110 the various availability status. Table 1220 summarizes a number of text messages from each of the different contact groups over a period of time. Table 1230 may summarize the number of calls and the duration of the calls from each of the different contact groups. The graph 1240 may illustrate several calls received from calls over a segment of time.

FIG. 13 depicts a method of a text message exchange between a caller and a recipient according to some embodiments. In step 1302, the virtual assistant system 110 may output an audio prompt, such as the eighth voicemail prompt from step 824 of FIG. 8. The audio prompt may prompt the caller to leave an audio message.

In step 1304, the caller leaves the audio message. In step 1306, the voice-to-text module may capture the audio message from the caller and convert the captured audio message to a first text message.

In step 1308, the texting module may send the first text message to the recipient. The recipient may receive the first text message and send a second text back to the recipient. The texting module may be integrated into the virtual assistant system 110 and provide a user interface which allows the user of the virtual assistant system 110 to send and receive text messages. In some embodiments, messages sent by the texting module may be in the form of an image, an emotional icon, emoji, gif, video, or some combination thereof.

The text messaging function may be accomplished by the texting module. In some embodiments, the caller may receive the text message in the caller's mobile system's texting software application. In various embodiments, the caller may receive the text message in a texting function which is integrated into the virtual assistant system.

In step 1310, the texting module may receive the second text from the recipient. Subsequent steps 1312 and 1314 may represent subsequent text exchanges between the caller and recipient.

In some embodiments, the virtual assistant system provides an automated recording, or a voicemail prompt, giving the user of the virtual assistant system an audio prompt identifying the contact group the caller belongs (e.g., over a speaker of the recipient's smartphone). In one example, the audio prompt identifies the name or nickname of the contact who is calling. The audio prompt may provide a way for the user of the virtual assistant system to determine who is calling without requiring the user to pick up the smartphone and/or distract the user, such as during driving. In some embodiments, the virtual assistant system may send a text message showing the name of the emergency contact, which may be active if the user has the mobile device on silent or vibration-only mode.

In some embodiments, the virtual assistant system 110 may automatically connect calls from particular contact groups after a predetermined connect period. The predetermined connect period may change depending on the status of the recipient. For example, the predetermined connect period may be shorter when the availability status is set to "free" when compared to when the availability status is set to "personal." In one embodiment, the predetermined connect period may change depending on the contact group. For example, the predetermined connect period may be shorter for callers belonging to the "immediate family" contact group compared to callers belonging to the "business" contact group. The predetermined connect period may be customized by the user of the virtual assistant system 110.

In some embodiments, the virtual assistant system 110 may automatically disconnect or send a voicemail prompt calls after a predetermined disconnect period. The predetermined disconnect period may change depending on the status of the recipient. For example, the predetermined disconnect period may be longer when the availability status is set to "free" when compared to when the availability status is set to "personal." In one embodiment, the predetermined disconnect period may change depending on the contact group. For example, the predetermined disconnect period may be longer for callers belonging to the "immediate family" contact group compared to callers belonging to the "business" contact group. The predetermined disconnect period may be customized by the user of the virtual assistant system 110.

FIG. 16 depicts a block diagram of an example computing device 1602 according to some embodiments. Computing device 1602 comprises a processor 1604, a memory 1606, a storage 1608, an input device 1610, a communication network interface 1612, and an output device 1614. Processor 1604 is configured to execute executable instructions (e.g., programs). In some embodiments, the processor 1604 comprises circuitry or any processor capable of processing the executable instructions.

Memory 1606 stores data. Some examples of memory 1606 include storage devices, such as RAM, ROM, RAM cache, virtual memory, etc. In various embodiments, working data is stored within memory 1606. The data within memory 1606 may be cleared or ultimately transferred to storage 1608.

Storage 1608 includes any storage configured to retrieve and store data. Some examples of storage 1608 include flash drives, hard drives, optical drives, and/or magnetic tape. Each of memory system 1606 and storage system 1608 comprises a computer-readable medium, which stores instructions or programs executable by processor 1604.

The input device 1610 is any device that inputs data (e.g., mouse, keyboard, stylus). Output device 1614 outputs data (e.g., speaker, display, virtual reality headset). It may be appreciated that storage 1608, input device 1610, and output device 1614 may be optional. For example, routers/switches may comprise processor 1604 and memory 1606 as well as a device to receive and output data (e.g., the communication network interface 1612 and/or the output device 1614).

A communication network interface 1612 may be coupled to a network (e.g., communication network 108) via communication network interface 1612. Communication network interface 1612 may support communication over an Ethernet connection, a serial connection, a parallel connection, and/or an ATA connection. Communication network interface 1612 may also support wireless communication (e.g., 802.11 a/b/g/n, WiMax, LTE, WiFi). It may be apparent that the communication network interface 1612 may support many wired and wireless standards.

The output device 1614 outputs data (e.g., speaker, display, virtual reality headset). It may be appreciated that the storage 1608, input device 1610, and output device 1614 may be optional. For example, routers/switches may comprise processor 1604 and memory 1606 as well as a device to receive and output data (e.g., the communication network interface 1612 and/or the output device 1614).

A module or engine may be hardware or software. In some embodiments, the module or engine may configure one or more processors to perform functions associated with the module or engine. Although different module or engine are discussed herein, it may be appreciated that the virtual assistant system 110 may include any number of modules or engines performing any or all functionality discussed herein.

The invention claimed is:

1. A nontransitory computer readable medium comprising instructions executable by a processor, the instructions being executable to perform a method, the method comprising:

receiving, from a recipient, a plurality of categories of availability statuses of the recipient, each of the categories of the plurality of categories being associated with a different availability status;

receiving a plurality of categories of different contact groups of the recipient;

identifying, for each contact of a plurality of contacts, at least one contact group of the different contact groups, there being at least two contacts of the plurality of contacts belonging to at least two different contact groups;

receiving a plurality of rules for call handling, each of the plurality of rules being associated with at least one of the different availability statuses of the recipient and at least one of the different contact groups, there being at least two rules of the plurality of rules, each rule of at least two rules being associated with different availability statuses;

receiving a telephone call from a first caller;

determining at least two contact groups of the first caller of the different contact groups, the first caller being a member of both of the at least two contact groups;

determining a prioritized contact group between the at least two contact groups, a priority of each contact group of the at least two contact groups being set by the recipient;

determining a current availability status of the recipient at the time of the call from the first caller;

identifying an applicable rule of the plurality of rules based on the prioritized contact group of the first caller and the current availability status of the recipient, the current availability status of the recipient being based at least on a current location of the recipient;

waiting a predetermined connect period after receiving the telephone call, wherein the predetermined connect period is determined based on both the current availability status of the recipient and the prioritized contact group of the first caller;

selecting a first response of a plurality of responses based on the applicable rule, each of the plurality of responses including different information; and presenting the first response based on the applicable rule after the predetermined connect period.

2. The nontransitory computer readable medium of claim 1, wherein the different contact groups include a contact group of emergency contacts and a group of work contacts.

3. The nontransitory computer readable medium of claim 1, wherein the plurality of categories of availability statuses of the recipient include "busy," "free," and "unavailable".

4. The nontransitory computer readable medium of claim 1, the method further comprising receiving a selection of the current availability status from the recipient.

5. The nontransitory computer readable medium of claim 1, the method further comprising determining the current availability status of the recipient based on one or more entries of the recipient's calendar indicating an activity of the recipient at a particular time.

6. The nontransitory computer readable medium of claim 1, wherein the first response to the first caller indicates that the first caller should send a text to the recipient and the first caller is not given an opportunity leave a voicemail during the first caller's call.

7. The nontransitory computer readable medium of claim 6, the method further comprising receiving a telephone call from a second caller;

identifying a caller identifier of the second caller;

determining a contact group of the second caller of the different contact groups, the contact group of the second caller being different from at least two contact groups of the first caller;

identifying an applicable rule of the plurality of rules based on the contact group of the second caller and the current availability status of the recipient; and passing the call from the second caller directly to the recipient based on the applicable rule of the plurality of rules based on the contact group of the second caller and the current availability status of the recipient.

8. The nontransitory computer readable medium of claim 7, the method further comprising:

receiving a telephone call from a third caller;

identifying a caller identifier of the third caller;

determining a contact group of the third caller of the different contact groups, the contact group of the third caller being different from the at least two contact groups of the first caller and the contact group of the second caller;

identifying an applicable rule of the plurality of rules based on the contact group of the third caller and the current availability status of the recipient; and providing, based on the applicable rule of the plurality of rules based on the contact group of the third caller and the current availability status of the recipient, an interactive audio system requesting the third caller to indicate if their call is urgent, and if the call is urgent then passing the call to the recipient, otherwise passing their call to a voicemail system.

9. The nontransitory computer readable medium of claim 7, the method further comprising:

receiving, after the first response, from the first caller a time when the caller is available for a return call from the recipient;

determining if the recipient's calendar indicates that the time when the first caller is available for the return call from the recipient is available for the recipient; and if the recipient's calendar indicates that the time when the first caller is available, then providing an indication in the recipient's calendar regarding the return call and providing an indication that the time is calendared to the first caller.

10. A method implemented by a processor executing instructions stored in a non-transitory computer readable medium, the method comprising:

receiving, from a recipient, a plurality of categories of availability statuses of the recipient, each of the categories of the plurality of categories being associated with a different availability status;

receiving a plurality of categories of different contact groups of the recipient;

identifying, for each contact of a plurality of contacts, at least one contact group of the different contact groups, there being at least two contacts of the plurality of contacts belonging to at least two different contact groups;

receiving a plurality of rules for call handling, each of the plurality of rules being associated with at least one of the different availability statuses of the recipient and at least one of the different contact groups, there being at least two rules of the plurality of rules, each rule of at least two rules being associated with different contact groups;

receiving a telephone call from a first caller;

determining at least two contact groups of the first caller of the different contact groups, the first caller being a member of both of the at least two contact groups;

determining a prioritized contact group between the at least two contact groups, a priority of each contact group being set by the recipient;

determining a current availability status of the recipient at a time of the call from the first caller;

identifying an applicable rule of the plurality of rules based on the prioritized contact group of the first caller and the availability status of the recipient;

waiting a predetermined connect period after receiving the telephone call, wherein the predetermined connect period is determined based on both the current availability status of the recipient and the prioritized contact group of the first caller;

selecting a first response of a plurality of responses based on the applicable rule, each of the plurality of responses including different information; and presenting the first response to the first caller based on the applicable rule after the predetermined connect period.

11. The method of claim 10, wherein the different contact groups include a contact group of emergency contacts and a group of work contacts.

12. The method of claim 10, wherein the plurality of categories of availability statuses of the recipient include "busy," "free," and "unavailable".

13. The method of claim 10, the method further comprising receiving a selection of the current availability status from the recipient.

14. The method of claim 10, the method further comprising determining the current availability status of the recipient based on one or more entries of the recipient's calendar indicating an activity of the recipient at a particular time.

15. The method of claim 10, wherein the first response to the first caller indicates that the first caller should send a text to the recipient and the first caller is not given an opportunity leave a voicemail during the first caller's call.

16. The method of claim 15, the method further comprising:

receiving a telephone call from a second caller;

identifying a caller identifier of the second caller;

determining a contact group of the second caller of the different contact groups, the contact group of the second caller being different from at least two contact groups of the first caller;

identifying an applicable rule of the plurality of rules based on the contact group of the second caller and the current availability status of the recipient; and passing the call from the second caller directly to the recipient based on the applicable rule of the plurality of rules based on the contact group of the second caller and the current availability status of the recipient.

17. The method of claim 16, the method further comprising:

receiving a telephone call from a third caller;

identifying a caller identifier of the third caller;

determining a contact group of the third caller of the different contact groups, the contact group of the third caller being different from the at least two contact groups of the first caller and the contact group of the second caller;

identifying an applicable rule of the plurality of rules based on the contact group of the third caller and the current availability status of the recipient; and providing, based on the applicable rule of the plurality of rules based on the contact group of the third caller and the current availability status of the recipient, an interactive audio system requesting the third caller to indicate if their call is urgent, and if the call is urgent then passing the call to the recipient, otherwise passing their call to a voicemail system.

18. The method of claim 16, the method further comprising:

receiving, after the first response, from the first caller a time when the caller is available for a return call from the recipient;

determining if the recipient's calendar indicates that the time when the first caller is available for the return call from the recipient is available for the recipient; and if the recipient's calendar indicates that the time when the first caller is available, then providing an indication in the recipient's calendar regarding the return call and providing an indication that the time is calendared to the first caller.

19. A system comprising:

at least one processor; and memory, the memory including instructions to control the at least one processor to:

receive, from a recipient, a plurality of categories of availability statuses of the recipient, each of the categories of the plurality of categories being associated with a different availability status;

receive a plurality of categories of different availability statuses of the recipient and at least one of the different contact groups, there being at least two contacts of the plurality of contacts belonging to at least two different contact groups;

receive a plurality of rules for call handling, each of the plurality of rules being associated with at least one of the different contact groups;

associate different rules of the plurality of rules for call handling with different contact groups, there being at least two rules of the plurality of rules, each rule of at least two rules being associated with different contact groups;

receive a telephone call from a first caller;

determine at least two contact groups of the first caller of the different contact groups, the first caller being a member of both of the at least two contact groups;

determine a prioritized contact group between the at least two contact groups, a priority of each contact group of the at least two contact groups being set by the recipient;

determine a current availability status of the recipient at a time of the call from the first caller;

identify an applicable rule of the plurality of rules based on the prioritized contact group of the first caller and the current availability status of the recipient;

wait a predetermined connect period after receiving the telephone call, wherein the predetermined connect period is determined based on both the current availability status of the recipient and the prioritized contact group of the first caller;

select a first response of a plurality of responses based on the applicable rule, each of the plurality of responses including different information; and present the first response to the first caller based on the applicable rule after the predetermined connect period.

\*   \*   \*   \*   \*